(12) United States Patent
Oz

(10) Patent No.: US 11,888,909 B2
(45) Date of Patent: Jan. 30, 2024

(54) AVATAR INFORMATION PROTECTION

(71) Applicant: TRUE MEETING INC., Los Altos, CA (US)

(72) Inventor: Ran Oz, Maccabim (IL)

(73) Assignee: TRUE MEETING INC., Los Altos, CA (US)

( * ) Notice: Subject to any disclaimer, the term of this patent is extended or adjusted under 35 U.S.C. 154(b) by 9 days.

(21) Appl. No.: 17/810,327

(22) Filed: Jun. 30, 2022

(65) Prior Publication Data

US 2022/0408060 A1 Dec. 22, 2022

Related U.S. Application Data

(63) Continuation of application No. 17/539,036, filed on Nov. 30, 2021, and a continuation of application No.
(Continued)

(51) Int. Cl.
*H04L 65/401* (2022.01)
*H04L 65/403* (2022.01)
(Continued)

(52) U.S. Cl.
CPC .......... *H04L 65/4015* (2013.01); *G06F 3/013* (2013.01); *G06N 3/04* (2013.01);
(Continued)

(58) Field of Classification Search
CPC ............ H04L 65/4015; H04L 12/1818; H04L 63/101; H04L 63/108; H04L 65/403; H04L 12/1822; H04L 63/102; H04L 65/1089; H04L 65/1093; H04L 65/80; G06F 3/013; G06N 3/04; G06N 3/045; G06T 7/11; G06T 7/70; G06T 15/04; G06T 15/20; G06T 15/205; G06T 17/20; G06T 19/00; G06T 19/20; G06T 2200/08; G06T 2207/30201;
(Continued)

(56) References Cited

U.S. PATENT DOCUMENTS

2013/0293584 A1 * 11/2013 Anderson ............. H04L 67/131
345/633
2014/0068462 A1 * 3/2014 Chang ................... H04W 4/023
715/753
(Continued)

*Primary Examiner* — Phung-Hoang J Nguyen
(74) *Attorney, Agent, or Firm* — Reches Patents

(57) ABSTRACT

A method for conducting a three dimensional (3D) video conference with multiple participants, the method may include (i) receiving, from a first participant and by software used to conduct the 3D video conference call, a request to see a second avatar that represents a second participant, within a representation of a virtual 3D environment displayed to the first participant during the 3D video conference; (ii) displaying the second avatar within the representation following a reception of (a) a first approval from the software to display the avatar within the representation, and (b) a second participant approval to display the avatar within the representation; and (iii) avoiding from displaying the second avatar within the representation until receiving the first approval and the second participant approval.

22 Claims, 24 Drawing Sheets

Related U.S. Application Data

17/304,378, filed on Jun. 20, 2021, said application No. 17/539,036 is a continuation of application No. 17/249,468, filed on Mar. 2, 2021, said application No. 17/304,378 is a continuation of application No. 17/249,468, filed on Mar. 2, 2021.

(60) Provisional application No. 63/201,713, filed on May 10, 2021, provisional application No. 63/199,014, filed on Dec. 1, 2020, provisional application No. 63/081,860, filed on Sep. 22, 2020, provisional application No. 63/023,836, filed on May 12, 2020.

(51) Int. Cl.
| | | |
|---|---|---|
| *H04N 7/15* | (2006.01) | |
| *H04L 9/40* | (2022.01) | |
| *H04L 12/18* | (2006.01) | |
| *G06T 7/11* | (2017.01) | |
| *G06T 7/70* | (2017.01) | |
| *G06F 3/01* | (2006.01) | |
| *G06N 3/04* | (2023.01) | |
| *G06T 15/04* | (2011.01) | |
| *G06T 15/20* | (2011.01) | |
| *G06T 17/20* | (2006.01) | |
| *G06T 19/00* | (2011.01) | |
| *G06T 19/20* | (2011.01) | |
| *H04N 7/14* | (2006.01) | |
| *G06N 3/045* | (2023.01) | |

(52) U.S. Cl.
CPC ............. *G06N 3/045* (2023.01); *G06T 7/11* (2017.01); *G06T 7/70* (2017.01); *G06T 15/04* (2013.01); *G06T 15/20* (2013.01); *G06T 15/205* (2013.01); *G06T 17/20* (2013.01); *G06T 19/00* (2013.01); *G06T 19/20* (2013.01); *H04L 12/1818* (2013.01); *H04L 63/101* (2013.01); *H04L 63/108* (2013.01); *H04L 65/403* (2013.01); *H04N 7/144* (2013.01); *H04N 7/147* (2013.01); *H04N 7/152* (2013.01); *H04N 7/157* (2013.01); *G06T 2200/08* (2013.01); *G06T 2207/30201* (2013.01); *G06T 2219/2004* (2013.01)

(58) Field of Classification Search
CPC ............ G06T 2219/2004; H04N 7/144; H04N 7/147; H04N 7/152; H04N 7/157
See application file for complete search history.

(56) References Cited

U.S. PATENT DOCUMENTS

2015/0379752 A1* 12/2015 Li .......................... G06T 13/80
　　　　　　　　　　　　　　　　　　　　　　　　　715/752
2017/0083086 A1*　3/2017　Mazur ................ G06F 3/04812

* cited by examiner

Receiving direction of gaze information regarding a direction of gaze of each participant within a representation of a virtual 3D video conference environment that may be associated with the participant. 210

Determining, for each participant, updated 3D participant representation information within the virtual 3D video conference environment, that reflects the direction of gaze of the participant. 220

Generating, for at least one participant, an updated representation of virtual 3D video conference environment, the updated representation of virtual 3D video conference environment represents the updated 3D participant representation information for at least some of the multiple participants. 230

Displaying, by a device of a participant of the multiple participants, an updated representation of the virtual 3D video conference environment, the updated representation may be associated with the participant. 240

Transmitting the updated representation of virtual 3D video conference environment to at least one device of at least one participant. 250

One or more additional steps. 290

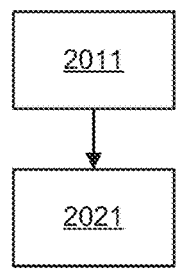
2001
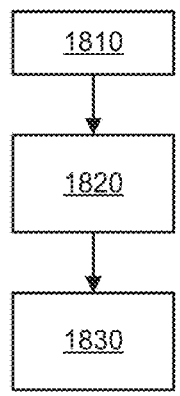
1800
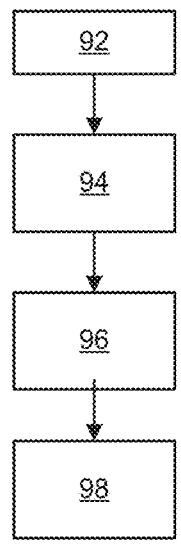
90
FIG. 6

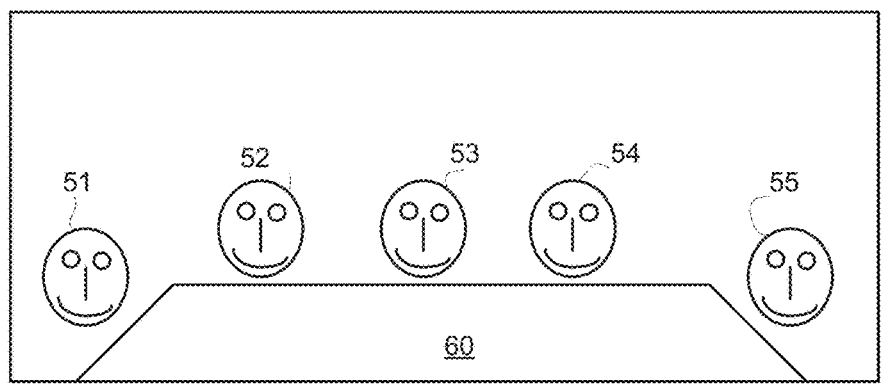
PANORAMIC VIEW 41
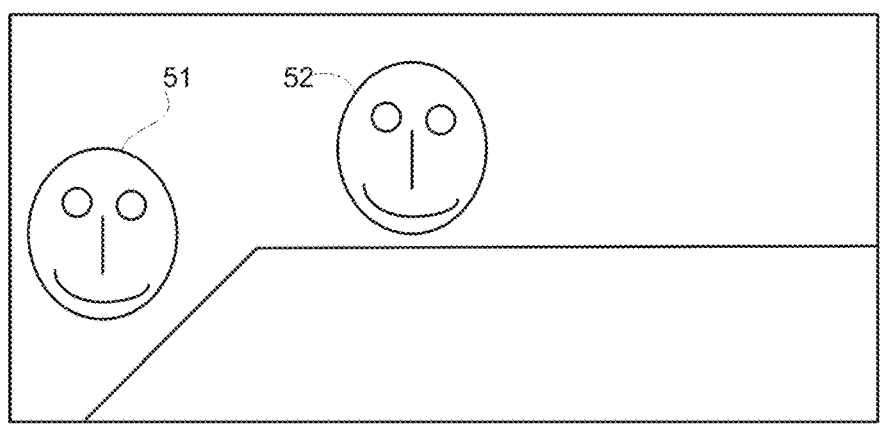
PARTIAL VIEW 42
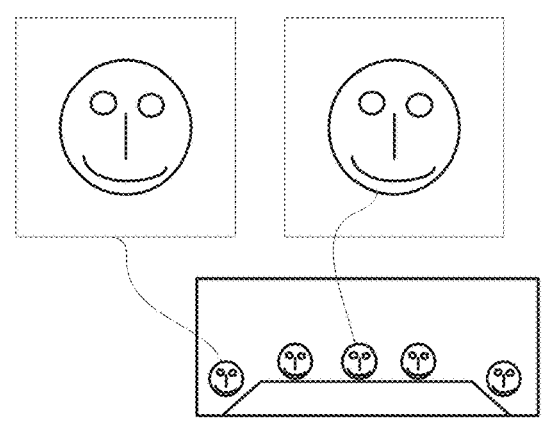
Hybrid view 43
FIG. 7

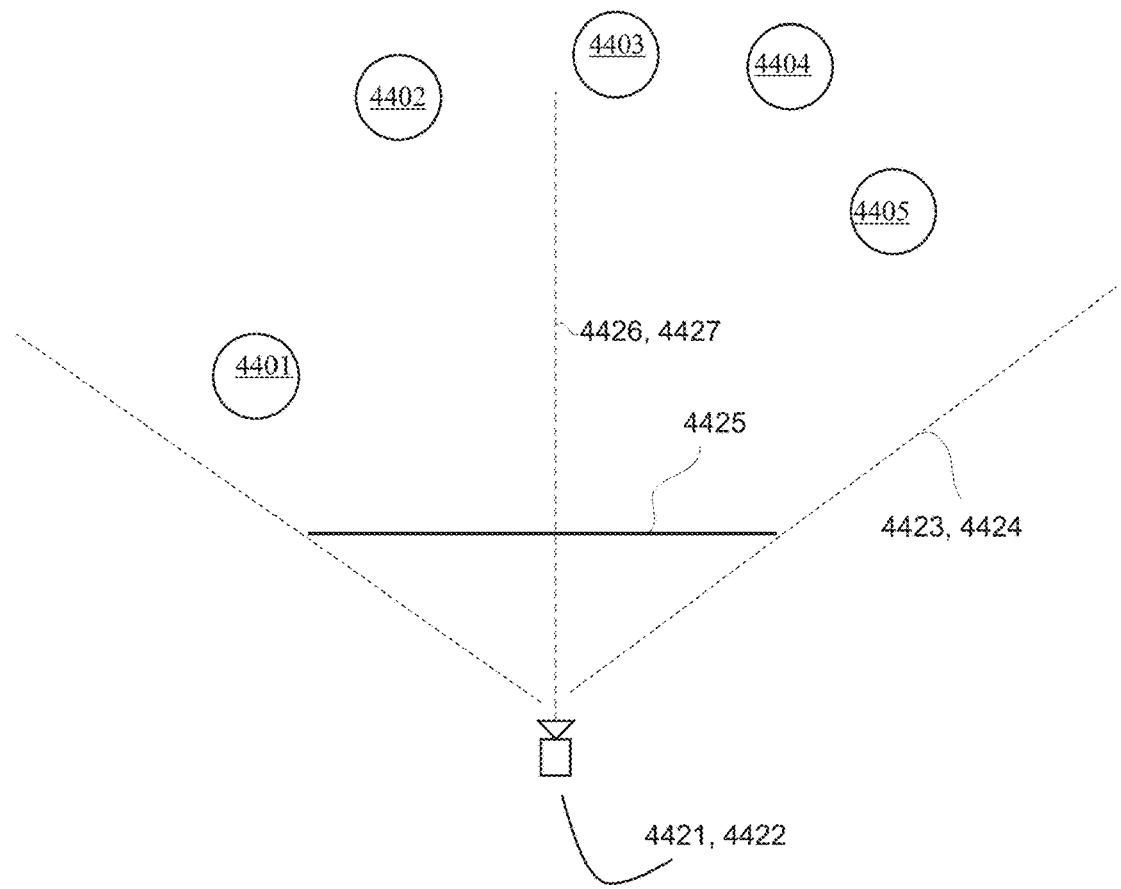
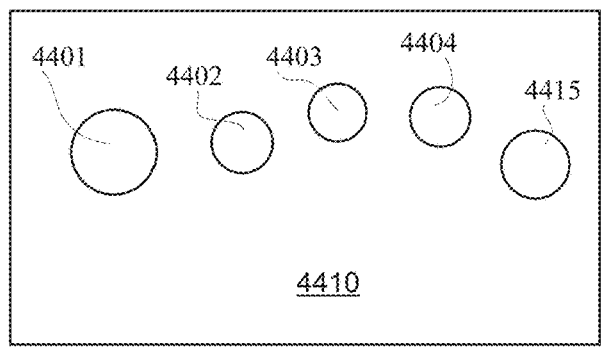
FIG. 8

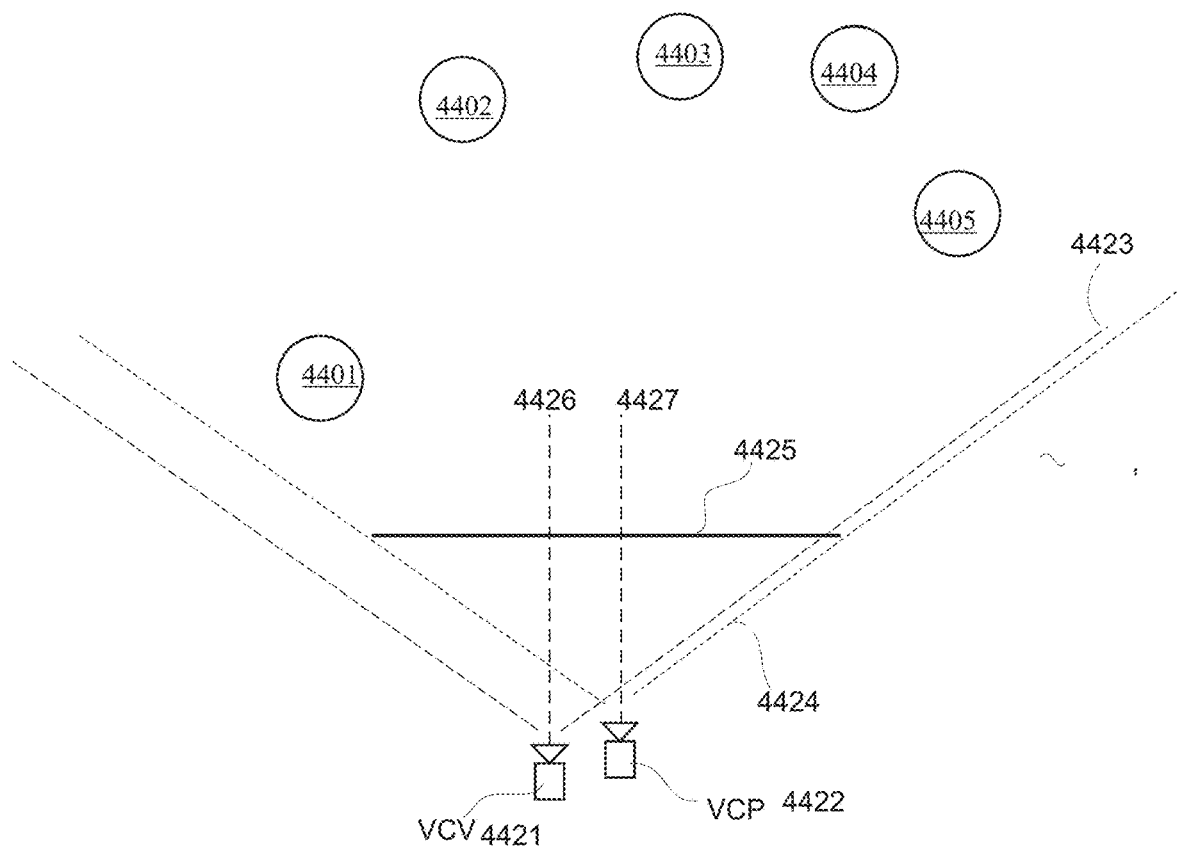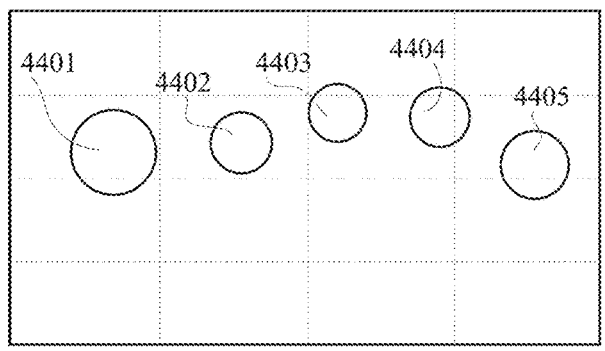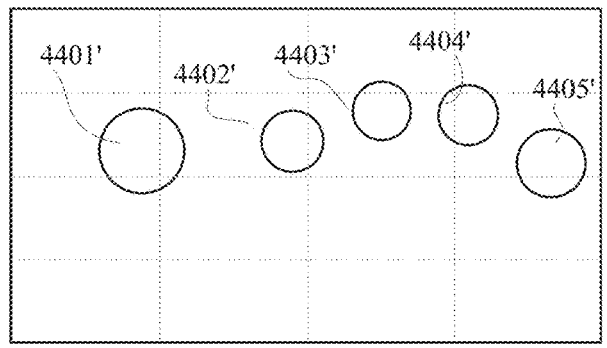
FIG. 9

Joints movement information obtaining unit 5251

Processor 5252

Machine learning process 5256

Rendering of the avatar 5255

Memory unit 5253

Mapping between joint movements and texture and muscle movements. 5257

Communication unit 5254

AVATAR INFORMATION PROTECTION

CROSS REFERENCE

This application claims priority from U.S. patent application Ser. No. 17/249,468 filing date Mar. 2, 2021, which claims priority from U.S. provisional patent Ser. No. 63/023,836 filing date May 12, 2020, from U.S. provisional patent Ser. No. 63/081,860 filing date Sep. 22, 2020, and from U.S. provisional patent Ser. No. 63/199,014 filing date Dec. 1, 2020, all being incorporated herein in their entirety.

This application claims priority from U.S. patent application Ser. No. 17/304,378 filing date Jun. 20, 2021, and from U.S. patent application Ser. No. 17/539,036 filing date Nov. 30, 2021, all being incorporated herein in their entirety.

BACKGROUND

Video conference calls are very popular. They require that each participant has their own computerized system with a camera that is usually located close to a display.

Typically, several participants in a meeting are presented in separate small tiles and another tile may be used for sharing one of the participants' screen.

Each participant is typically shown with the background of their own office or with a virtual background of their selection.

There is a growing need to enhance the virtual interaction between participants and to overcome various other problems associated with current video conference call services.

SUMMARY

There may be provided a system, method and computer readable medium for generating an alpha channel.

BRIEF DESCRIPTION OF THE DRAWINGS

FIG. 1 illustrates an example of a method;
FIG. 6 includes examples of methods;
FIG. 7 is an example of a panoramic view of a virtual 3D environment populated by five participants, a partial view of the some of the participants within the virtual 3D environment, and a hybrid view;
FIG. 8 illustrates two camera, fields of views of the two cameras, avatars and a displayed virtual 3D video conference environment (V3DVCE);
FIG. 9 illustrates two camera, fields of views of the two cameras, avatars and a displayed V3DVCE;
FIG. 17B illustrates an example of a computerized system.

DESCRIPTION OF THE DRAWINGS

Figure 2:
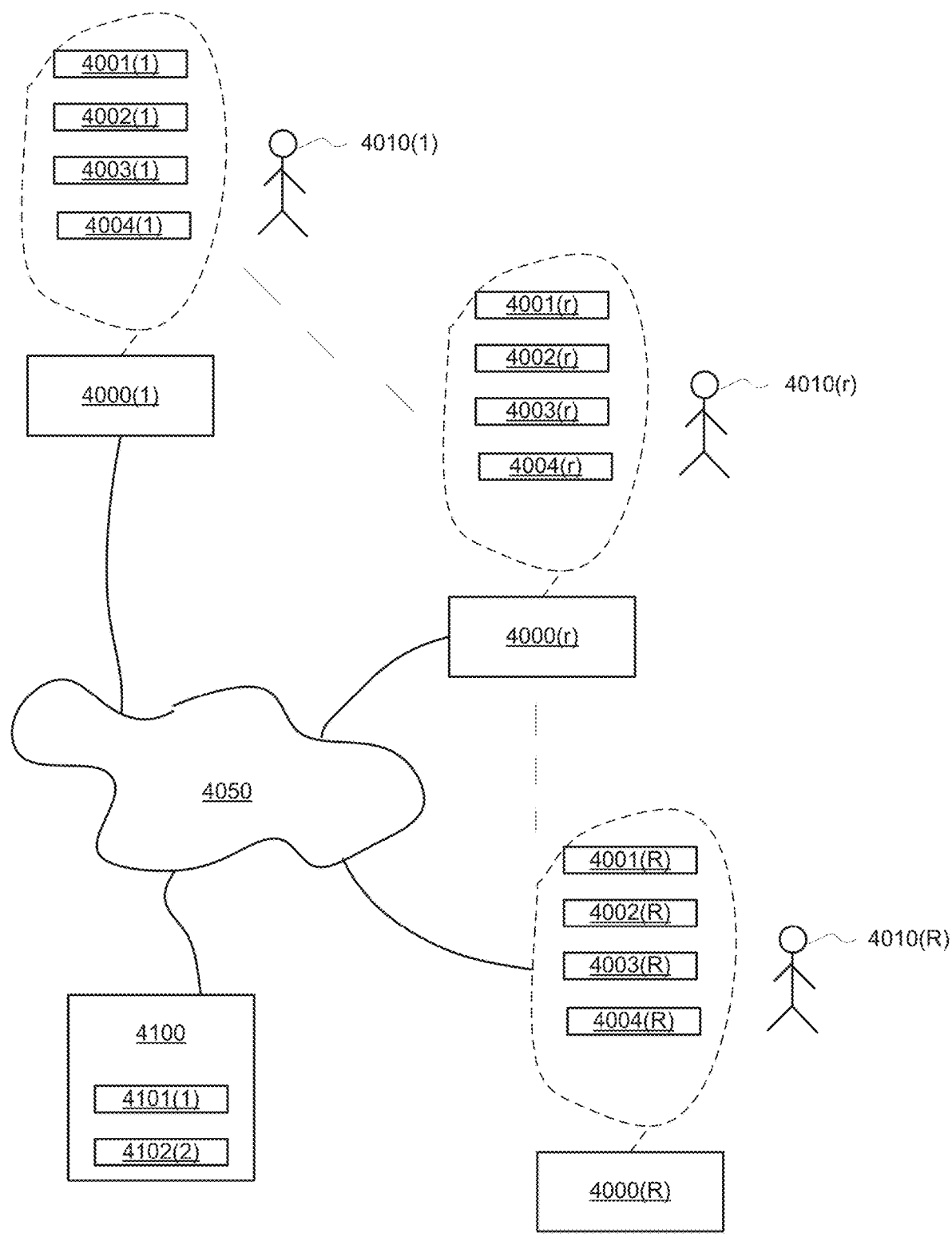
FIG. 2 illustrates an example of a computerized environment.

In the following detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure.

Any reference in the specification to a method should be applied mutatis mutandis to a system capable of executing the method and should be applied mutatis mutandis to a computer readable medium that is non-transitory and stores instructions for executing the method.

Any reference in the specification to a system should be applied mutatis mutandis to a method that may be executed by the system and should be applied mutatis mutandis to a computer readable medium that is non-transitory and stores instructions executable by the system.

Any reference in the specification to a computer readable medium that is non-transitory should be applied mutatis mutandis to a method that may be applied when executing instructions stored in the computer readable medium and should be applied mutatis mutandis to a system configured to execute the instructions stored in the computer readable medium.

The term "and/or" means additionally or alternatively.

Any reference to a "user" should be applied mutatis mutandis to the term "participant"—and vice versa.

There is provided a method, a non-transitory computer readable medium and a system related to video and may, for example be applicable to 3D video conference calls. At least some of the examples and/or embodiments illustrated in the applications may be applied mutatis mutandis for other purposes and/or during other applications.

For example, referring to a 3D video conference that involves multiple participants. A first participant is imaged, and a second participant wishes to view a first avatar (or any other 3D visual representation) of the first participant within a virtual 3D video conference environment.

The generation of the first avatar (or any other 3D visual representation) may be executed in various manners—for example—only by a device of the second participant, only by the device of the first participant, partially by the device of the second participant, partially by the device of the first participant, by a cooperation between the devices of the first and second participants, by another computerized system (such as but not limited to a cloud system or a remote system), and/or any combination of one or more devices.

The inclusion of the avatar (or any other 3D visual representation) within the virtual 3D video conference environment may be executed in various manners—for example—only by a device of the second participant, only by the device of the first participant, partially by the device of the second participant, partially by the device of the first participant, by a cooperation between the devices of the first and second participants, by another device (such as but not limited to a cloud device or a remote device), and/or any combination of one or more devices.

Any reference to one manner of execution of any step of the generation of the first avatar and/or any reference to one manner of execution of any step of the inclusion of the avatar within the virtual 3D video conference environment may be applied mutatis mutandis to any other manner of execution.

The generation of the first avatar and/or the inclusion of the first avatar may be responsive to information gained by the device of the first user or to a camera or sensor associated with the device of the first user. A non-limiting example of information may include information regarding the first participant and/or information regarding to the acquisition of images of the first participant (for example camera setting, illumination and/or ambient conditions).

The system may include multiple user devices and/or intermediate devices such as servers, cloud computers, and the like.

FIG. 1 illustrates an example of method 200.

Method 200 is for conducting a three-dimensional video conference between multiple participants.

Method 200 may include steps 210, 220 and 230.

Step 210 may include receiving direction of gaze information regarding a direction of gaze of each participant within a representation of a virtual 3D video conference environment that is associated with the participant.

The representation of a virtual 3D video conference environment that is associated with the participant is a representation that is shown to the participant. Different participants may be associated with different representation of a virtual 3D video conference environment.

The direction of gaze information may represent a detected direction of gaze of the participant.

The direction of gaze information may represent an estimated direction of gaze of the participant.

Step 220 may include determining, for each participant, updated 3D participant representation information within the virtual 3D video conference environment, that reflects the direction of gaze of the participant. Step 220 may include estimating how the virtual 3D video conference environment will be seen from the direction of gaze of the participant.

Step 230 may include generating, for at least one participant, an updated representation of virtual 3D video conference environment, the updated representation of virtual 3D video conference environment represents the updated 3D participant representation information for at least some of the multiple participants. Step 230 may include rendering images of the virtual 3D video conference environment for at least some of the multiple participants. Alternatively—step 230 may include generating input information (such as 3D model and/or one or more texture maps) to be fed to a rendering process.

Method 200 may also include step 240 of displaying, by a device of a participant of the multiple participants, an updated representation of the virtual 3D video conference environment, the updated representation may be associated with the participant.

Method 200 may include step 250 of transmitting the updated representation of virtual 3D video conference environment to at least one device of at least one participant.

The multiple participants may be associated with multiple participant devices, wherein the receiving and determining may be executed by at least some of the multiple participant devices. Any step of method 200 may be executed by at least some of the multiple participant device or by another computerized system.

The multiple participants may be associated with multiple participant devices, wherein the receiving and determining may be executed by a computerized system that differs from any of the multiple participant devices.

Method 200 may include one of more additional steps—collectively denoted 290.

The one or more additional steps may include at least one out of:

a. Determining a field of view of a third participant within the virtual 3D video conference environment.

b. Setting a third updated representation of the virtual 3D video conference environment that may be sent to a third participant device to reflect the field of view of the third participant.

c. Receiving initial 3D participant representation information for generating the 3D representation of the participant under different circumstances. The different circumstances may include at least one out of (a) different image acquisition conditions (different illumination and/or collection conditions), (b) different directions of gaze, (c) different expressions, and the like.

d. Receiving in run time, circumstances metadata; and amending, in real time, the updated 3D participant representation information based on the circumstances metadata.

e. Repetitively selecting for each participant, a selected 3D model out of multiple 3D models of the participant.

f. Repetitively smoothing a transition from one selected 3D model of the participant to another 3D model of the participant.

g. Selecting an output of at least one neural network of the multiple neural networks based on a required resolution.

h. Receiving or generating participants appearance information about head poses and expressions of the participants.

i. Determining the updated 3D participant representation information to reflect the participant appearance information.

j. Determine a shape of each of the avatars that represent the participants.

k. Determining relevancy of segments of updated 3D participant representation information.
l. Selecting which segments to transmit, based on the relevancy and available resources.
m. Generating a 3D model and one or more texture maps of 3D participant representation information of a participant.
n. Estimating 3D participant representation information of one or more hidden areas of a face of a participant.
o. Estimating 3D model hidden areas and one or more hidden parts texture maps.
p. Determining a size of the avatar.
q. Receiving audio information regarding audio from the participants and appearance information.
r. Synchronizing between the audio and the 3D participant representation information.
s. Estimating face expressions of the participants based on audio from the participants.
t. Estimating movements of the participants.

The receiving of the 3D participant representation information may be done during an initialization step.

The initial 3D participant representation information may include an initial 3D model and one or more initial texture maps.

The 3D participant representation information may include a 3D model and one or more texture maps.

The 3D model may have separate parameters for shape, pose and expression.

Each of the one or more texture maps may be selected and/or augmented based on at least one out of shape, pose and expression.

Each of the one or more texture maps may be selected and/or augmented based on at least one out of shape, pose, expression and angular relationship between a face of the participant and an optical axis of a camera that captures an image of face of the participant.

The determining, for each participant, of the updated 3D participant representation information may include at least one of the following:
a. Using one or more neural network for determining the updated 3D participant representation information.
b. Using multiple neural networks for determining the updated 3D participant representation information, wherein different neural networks of the multiple neural networks may be associated with different circumstances.
c. Using multiple neural networks for determining the updated 3D participant representation information, wherein different neural networks of the multiple neural networks may be associated with different resolutions.

The updated representation of the virtual 3D video conference environment may include an avatar per participant of the at least some of the multiple participants.

A direction of gaze of an avatar within the virtual 3D video conference environment may represent a spatial relationship between a (a) direction of gaze of a participant that may be represented by the avatar and (b) a representation of the virtual 3D video conference environment displayed to the participant.

The direction of gaze of an avatar within the virtual 3D video conference environment may be agnostic to an optical axis of a camera that captured a head of the participant.

An avatar of a participant within the updated representation of the virtual 3D video conference environment may appear in the updated representation of the virtual 3D video conference environment as being captured by a virtual camera located on a virtual plane that crosses the eyes of the first participant. Accordingly—the virtual camera and the eye may be located, for example at the same height.

The updated 3D participant representation information may be compressed.

The updated representation of the virtual 3D video conference environment may be compressed.

The generating of the 3D model and one or more texture maps may be based on images of the participant that were acquired under different circumstances.

The different circumstances may include different viewing directions of a camera that acquired the images, different poses, and different expressions of the participant.

The estimating of the 3D participant representation information of one or more hidden areas may be executed by using one or more generative adversarial networks.

The determining, for each participant, of the updated 3D participant representation information may include at least one out of:
a. Applying a super-resolution technique.
b. Applying noise removal.
c. Changing an illumination condition.
d. Adding or changing wearable item information.
e. adding or changing make up information.

The updated 3D participant representation information may be encrypted.

The updated representation of virtual 3D video conference environment may be encrypted.

The appearance information may be about head poses and expressions of the participants and/or be about lip movements of the participants.

The estimating face expressions of the participants based on audio from the participants may be executed by a neural network trained to map audio parameters to face expression parameters.

FIG. 2 illustrates an example of a computational environment that include users devices 4000(1)-4000(R) of users 4010(1)-4010(R). Index r ranges between 1 and R, R being a positive integer. The r'th user device 4000($r$) may be any computerized device that may include one or more processing circuit 4001($r$), a memory 4002($r$), a man machine interface such as a display 4003($r$), and one or more sensors such as camera 4004($r$). The r'th user 4010($r$) is associated with (uses) the r'th user device 4000($r$). The camera may belong to the man machine interface.

The users devices 4000(1)-4000(R) and a remote computerized system 4100 may communicate over one or more networks such as network 4050. The one or more networks may be any type of networks—the Internet, a wired network, a wireless network, a local area network, a global network, and the like.

The remote computerized system may include one or more processing circuits 4101(1), a memory 4101(2), and may include any other component.

Any one of the users devices 4000(1)-4000(R) and a remote computerized system 4100 may participate in the execution of any method illustrated in the specification. Participate means executing at least one step of any of said methods.

Any processing circuit may be used—one or more network processors, non-neural network processors, rendering engines, image processors and the like.

One or more neural networks may be located at a user device, at multiple users devices, at a computerized system outside any of the user devices, and the like.

Figure 3:
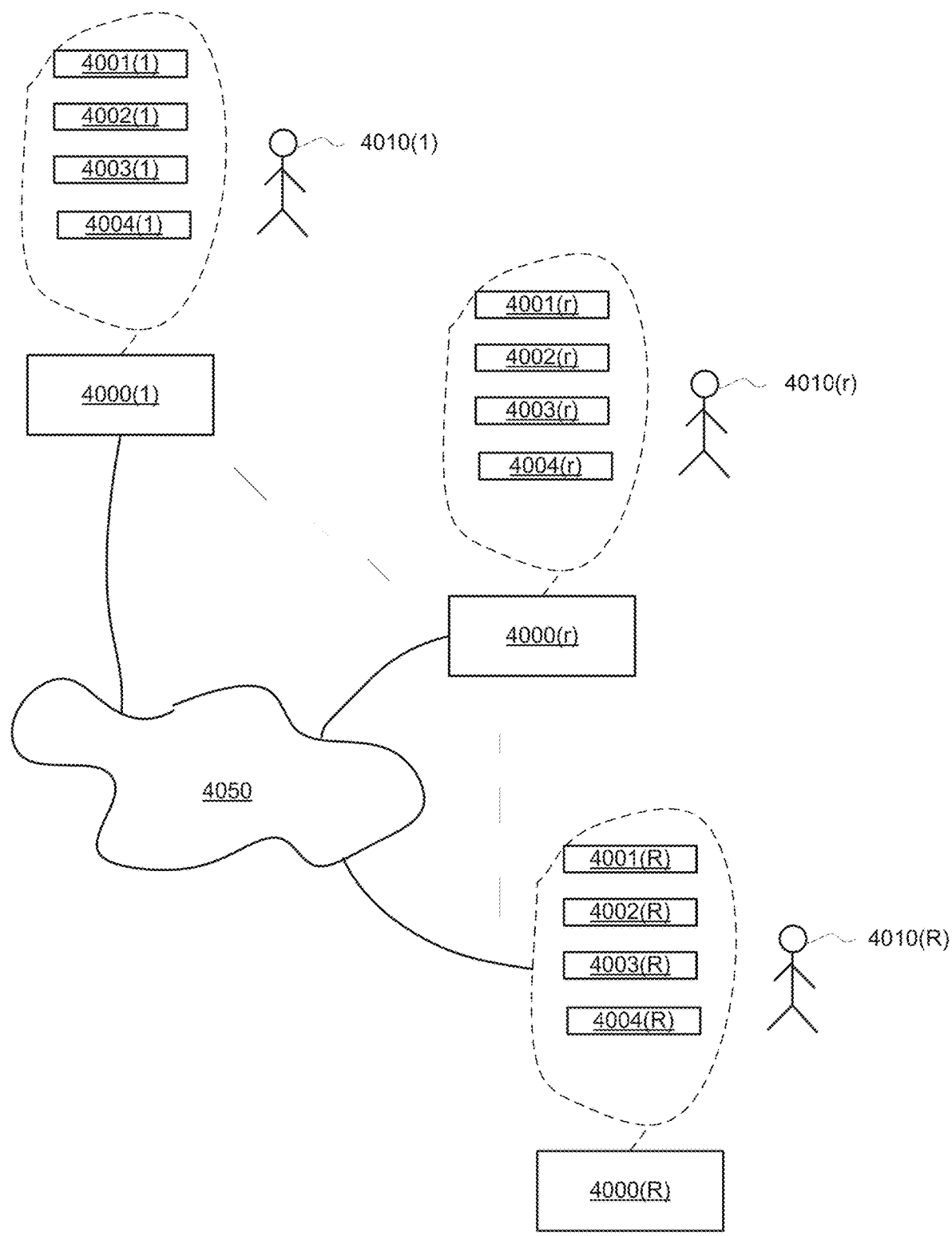
FIG. 3 illustrates an example of a computerized environment.

FIG. 3 illustrates an example of a computational environment that include users devices 4000(1)-4000(R) of users 4010(1)-4010(R). Index r ranges between 1 and R, R being a positive integer. The r'th user device 4000(r) may be any computerized device that may include one or more processing circuit 4001(r), a memory 4002(r), a man machine interface such as a display 4003(r), and one or more sensors such as camera 4004(r). The r'th user 4010(r) is associated with (uses) the r'th user device 4000(r).

The users devices 4000(1)-4000(R) may communicate over one or more networks such as network 4050.

Any one of the users devices 4000(1)-4000(R) may participate in the execution of any method illustrated in the specification. Participate means executing at least one step of any of said methods.

Figure 4:
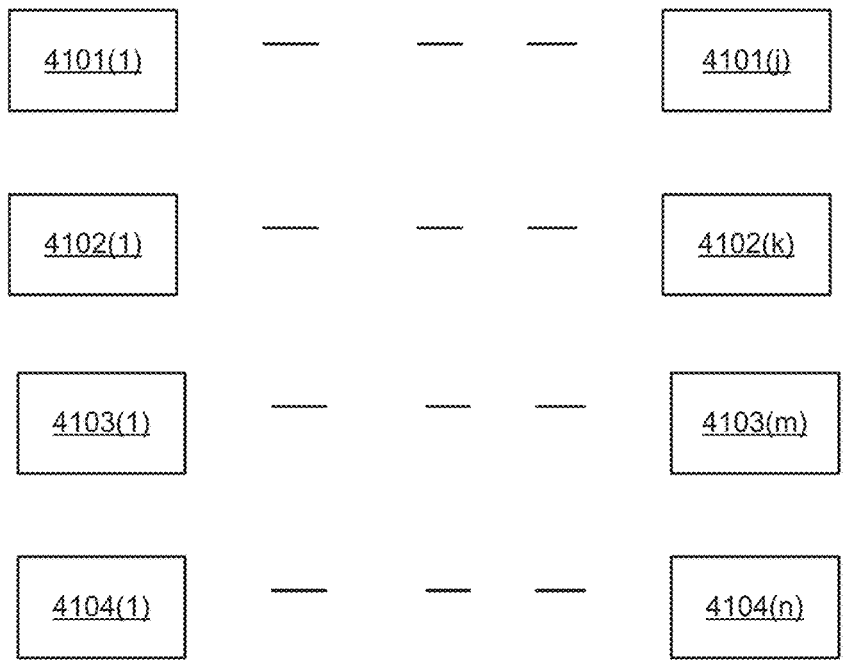
FIG. 4 illustrates an example of data structures.

FIG. 4 illustrates an example of various data structures. The data structures may include user avatars 4101(1)-4101(j), texture maps 4102(1)-4102(k), 3D models 4103(1)-4103(m), 3D representations of objects 4104(1)-4104(n), and any mapping or other data structures mentioned in the application.

Any user may be associated with one or more data structure of any type—avatar, 3D model, texture map, and the like.

Some of the examples refer to a virtual 3D video conference environment such as a meeting room, restaurant, cafe, concert, party, external or imaginary environment in which the users are set. Each participant may choose or be otherwise associated with a virtual or actual background and/or may select or otherwise receive any virtual or actual background in which avatars related to at least some of the participants are displayed. The virtual 3D video conference environment may include one or more avatars that represents one or more of the participants. The one or more avatars may be virtually located within the virtual 3D video conference environment. One or more features of the virtual 3D video conference environment (that may or may not be related to the avatars) may differ from one participant to another.

Either the full body, the upper part of the body or just the face of the users are seen in this environment—thus an avatar may include full body of a participant, the upper part of a body of the participant body or just the face of the participant.

Within the virtual 3D video conference environment there may be provided an improved visual interaction between users that may emulate the visual interaction that exists between actual users that are actually positioned near each other. This may include creating or ceasing to have eye-contact, expressions directed at specific users and the like.

In a video conference call between different users, each user may be provided with a view of one or more other users—and the system may determine (based on gaze direction and the virtual environment)—where the user looks (for example at one of the other users—at none of the users, at a screen showing a presentation, at a whiteboard, etc.)—and this is reflected by the virtual representation (3D model) of the user within the virtual environment—so that other users may determine where the user is looking.

Figure 5:
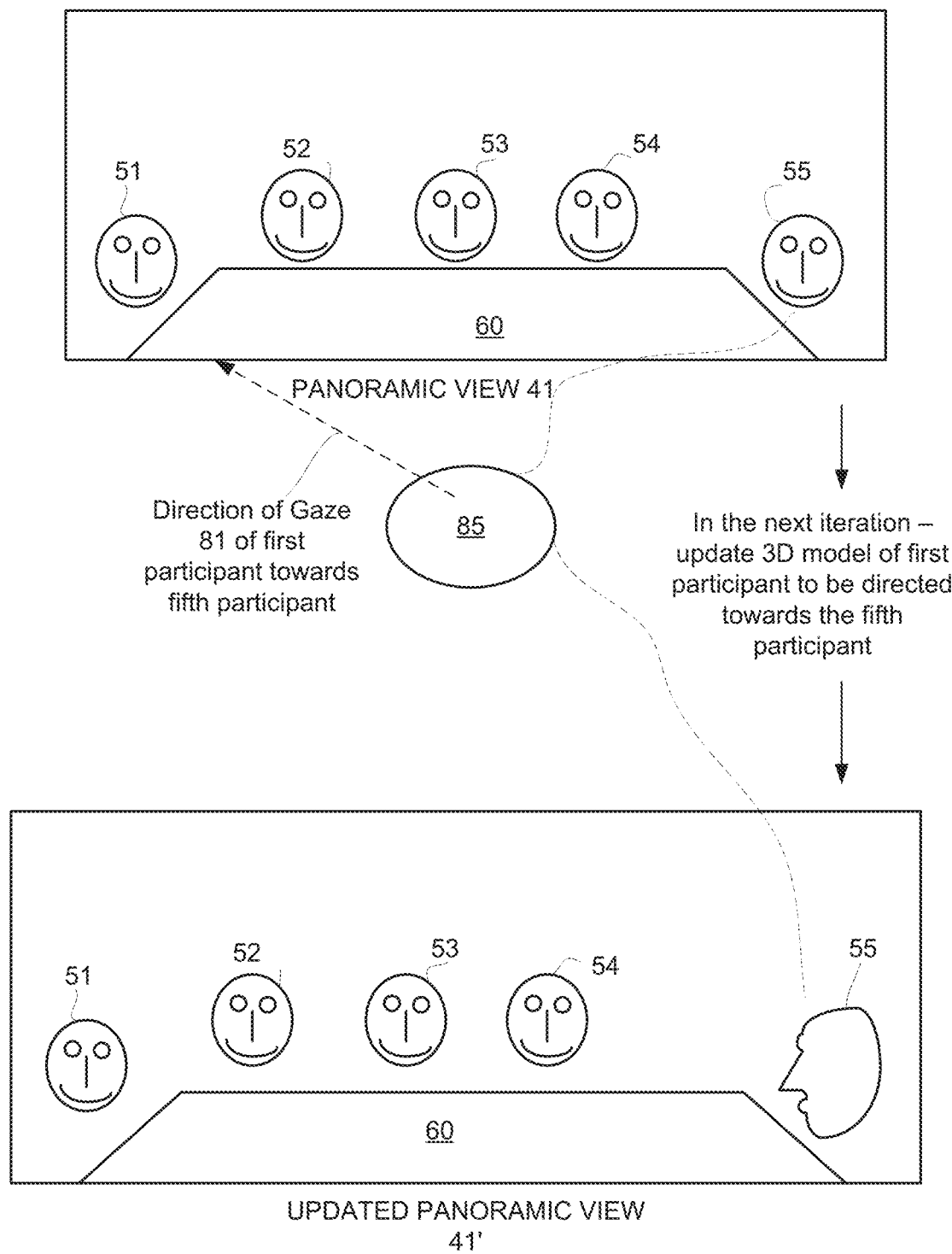
FIG. 5 illustrates an example of a process for amending a direction of view of a 3D model of a part of a participant according to a direction of gaze of the participant.

FIG. 5 illustrates an example of a process for amending a direction of view of an avatar of a part of a participant according to a direction of gaze of the participant. The upper part of FIG. 5 is a virtual 3D video conference environment—represented by a panoramic view 41 of five participants 51, 52, 53, 54 and 55 sitting near table 60. All participants face the same direction—the screen.

In the lower image the avatar of the fifth participant faces the avatar of first participant—as the fifth participant was detected to look at the 3D model of the first participant within the environment as presented to the fifth participant.

Tracking the user's eyes and gaze direction may also be used to determine the direction in which the user is looking (direction of gaze) and at which person or object the user is looking. This information can be used to rotate the avatar's head and eyes so that in the virtual space it also appears as if the user is looking at the same person or object as in the real world.

Tracking the user's head pose and eye gaze may also be used to control the virtual world's appearance on the user's screen. For example, if the user looks at the right side of the screen, the point of view of the virtual camera may move to the right, so that the person or object at which the user is looking is located at the center of the user's screen.

The rendering of a user's head, body, and hands from a certain point of view that is different than the original point of view of the camera may be done in different ways, as described below:

In one embodiment, a 3D model and texture maps are created before the beginning of the meeting and this model is then animated and rendered at run time according to the user's pose and expressions that are estimated from the video images.

A texture map is a 2D image in which each color pixel represents the red, green and blue reflectance coefficients of a certain area in the 3D model. An example of a texture map is shown in FIG. 20. Each color pixel in the texture map corresponds to certain coordinates within a specific polygon (e.g., triangle) on the surface of the 3D model.

Generally, each pixel in the texture map has an index of the triangle to which it is mapped and 3 coordinates defining its exact location within the triangle.

A 3D model composed of a fixed number of triangles and vertices may be deformed as the 3D model changes. For example, a 3D model of a face may be deformed as the face changes its expression. Nevertheless, the pixels in the texture map correspond to the same locations in the same triangles, even though the 3D locations of the triangles change as the expression of the face changes.

Texture maps may be constant or may vary as a function of time, expression or of viewing angle. In any case, the correspondence of a given pixel in a texture map and a certain coordinate in a certain triangle in the 3D model doesn't change.

In yet another embodiment, a new view is created based on a real-time image obtained from a video camera and the position of the new point of view (virtual camera).

In order to best match between the audio and the lip movement and facial expressions, the audio and video that is created from the rendering of the 3D models based on the pose and expressions parameters are synchronized. The synchronization may be done by packaging the 3D model parameters and the audio in one packet corresponding to the same time frame or by adding time stamps to each of the data sources.

To further improve the natural appearance of the rendered model, a neural network may be trained to estimate the facial expression coefficients based on the audio. This can be done by training the neural network using a database of videos of people talking and the corresponding audio of this speech. The videos may be of the participant that should be represented by an avatar or of other people. Given enough examples, the network learns the correspondence between the audio (i.e. phonemes) and the corresponding face movements, especially the lip movements. Such a trained network would enable to continuously render the facial expressions and specifically the lip movements even when the video quality is low or when part of the face is obstructed to the original video camera.

In yet another embodiment, a neural network can be trained to estimate the audio sound from the lip and throat movements or from any other facial cues, as is done by professional lip readers. This would enable to create or improve the quality of the audio when the audio is broken or when there are background noises that reduce its quality.

In yet another embodiment a neural network is trained to compress audio by finding a latent vector of parameters from which the audio can be reconstructed at a high quality. Such a network could serve to compress audio at a lower bit rate than possible with standard audio compression methods for a given audio quality or obtain a higher audio quality for a given bit rate.

Such a network may be trained to compress the audio signal to a fixed number of coefficients, subject to the speech being as similar as possible to the original speech under a certain cost function.

The transformation of the speech to a set of parameters may be a nonlinear function and not just a linear transformation as is common in standard speech compression algorithms. One example would be that the network would need to learn and define a set of basis vectors which form a spanning set of spoken audio.

The parameters then would be the vectorial coefficients of the audio as spanned by this set.

FIG. 6 illustrates method 2001.

Method 2001 is for conducting a 3D video conference between multiple participants, the method may include steps 2011 and 2021.

Step 2011 may include determining, for each participant, updated 3D participant representation information within the virtual 3D video conference environment, that represents participant. The determining may be based on audio generated by the participants and appearance information about appearance of the participants.

Step 2021 may include generating, for at least one participant, an updated representation of virtual 3D video conference environment, the updated representation of virtual 3D video conference environment represents the updated 3D participant representation information for at least some of the multiple participants. For example, any movement by the participant may expose or collude parts of the environment. Additionally, movements by participant may affect lighting in the room as the movements may modify the exposure to light of different parts of the environment.

The method may include matching between the audio from a certain participant and appearance information of a certain participant.

The appearance information may be about head poses and expressions of the participants.

The appearance information may be about lip movements of the participants.

Communications System Based on the 3D Models.

During the communication session, i.e., a 3D video conference call between several users, a 2D or 3D camera (or several cameras) grabs videos of the users. From these videos a 3D model (for example—the best fitting 3D model) of the user may be created at a high frequency, e.g., at a frame rate of 15 to 120 fps.

Temporal filters or temporal constraints in the neural network may be used to assure a smooth transition between the parameters of the model corresponding to the video frames in order to create a smooth temporal reconstruction and avoid jerkiness of the result.

The real-time parametric model together with the reflectance map and other maps may be used to render a visual representation of the face and body that may be very close to the original image of the face and body in the video.

Since this may be a parametric model, it may be represented by a small number of parameters. Typically, less than 300 parameters may be used to create a high-quality model of the face including each person's shape, expression and pose.

These parameters may be further compressed using quantization and entropy coding such as a Huffman or arithmetic coder.

The parameters may be ordered according to their importance and the number of parameters that may be transmitted and the number of bits per parameter may vary according to the available bandwidth.

In addition, instead of coding the parameters' values, the differences of these values between consecutive video frames may be coded.

The model's parameters may be transmitted to all other user devices directly or to a central server. This may save a lot of bandwidth as instead of sending the entire model of the actual high-quality image during the entire conference call—much fewer bits representing the parameters may be transmitted. This may also guarantee a high quality of the video conference call, even when the current available bandwidth may be low.

Transmitting the model parameters directly to the other users instead of via a central server may reduce the latency by about 50%.

The other user devices may reconstruct the appearance of the other users from the 3D model parameters and the corresponding reflectance maps. Since the reflectance maps, representing such things as a person's skin color change very slowly, they may be transmitted only once at the beginning of the session or at a low updating frequency according to changes that occur in these reflectance maps.

In addition, the reflectance maps and other maps may be updated only partially, e.g., according to the areas that have changed or according to semantic maps representing body parts. For example, the face may be updated but the hair or body that may be less important for reconstructing emotions may not be updated or may be updated at a lower frequency.

In some cases, the bandwidth available for transmission may be limited. Under such conditions, it may be useful to order the parameters to transmit according to some prioritization and then transmit the parameters in this order as the available bandwidth allows. This ordering may be done according to their contribution to the visual perception of a realistic video. For example, parameters related to the eyes and lips may have higher perceptual importance than those related to cheeks or hair. This approach would allow for a graceful degradation of the reconstructed video.

The model parameters, video pixels that may be not modelled and audio may be all synchronized.

As a result, the total bandwidth consumed by the transmission of the 3D model parameters may be several hundred bits per second and much lower than the 100 kbps-3 Mbps that may be typically used for video compression.

A parametric model of the user's speech may also be used to compress the user's speech beyond what may be possible with a generic speech compression method. This would further reduce the required bandwidth required for video and audio conferencing. For example, a neural network may be used to compress the speech into a limited set of parameters from which the speech can be reconstructed. The neural network is trained so that the resulting decompressed speech is closest to the original speech under a specific cost function. The neural network may be a nonlinear function, unlike linear transformations used in common speech compression algorithms.

The transmission of bits for reconstructing the video and audio at the receiving end may be prioritized so that the most important bits may be transmitted or receive a higher quality of service. This may include but may not be limited to prioritizing audio over video, prioritizing of the model parameters over texture maps, prioritizing certain areas of the body or face over others, such as prioritizing information relevant to the lips and eyes of the user.

An optimization method may determine the allocation of bitrate or quality of service to audio, 3D model parameters, texture maps or pixels or coefficients that may be not part of the model in order to ensure an overall optimal experience. For example, as the bitrate is reduced, the optimization algorithm may decide to reduce the resolution or update frequency of the 3D model and ensure a minimal quality of the audio signal.

The users may be provided with one or more views of the virtual 3D video conference environment—whereas the user may or may not select the field of view—for example, a field of view that includes all of the other users or only one or some of the users, and/or may select or may view one or some objects of the virtual 3D video conference environment such as TV screens, whiteboards, etc.

When combining the video pixels and the rendered 3D models, the areas corresponding to the model, the areas corresponding to the video pixels, or both may be processed so that the combination may appear natural and a seam between the different areas would not be apparent. This may include but may be not limited to relighting, blurring, sharpening, denoising or adding noise to one or some of the image components so that the whole image appears to originate from one source.

Each user may use a curved screen or a combination of physical screens to that the user in effect can see a panoramic image showing a 180 or 360 degree view (or any other angular range view) of the virtual 3D video conference environment and/or a narrow field of view image focusing on part of the virtual 3D video conference environment such as a few people, one person, only part of a person, i.e. the person's face, a screen or a whiteboard or any one or more parts of the virtual 3D video conference environment.

The user will be able to control the part or parts of the narrow field of view image or images by using a mouse, a keyboard, a touch pad or a joystick or any other device that allows to pan and zoom in or out of an image.

The user may be able to focus on a certain area in the virtual 3D video conference environment (for example a panoramic image of the virtual 3D video conference environment) by clicking on the appropriate part in the panoramic image.

FIG. 7 illustrates an example of a panoramic view 41 of the virtual 3D video conference environment populated by five participants and a partial view 42 of the some of the participants within the virtual 3D video conference environment. FIG. 7 also illustrates a hybrid view 43 that includes a panoramic view (or a partial view) and expanded images of faces of some of the participants.

The user may be able to pan or zoom using head, eyes, hands, or body gestures. For example, by looking at the right or left part of the screen, the focus area may move to the left or right, so it appears at the center of the screen, and by leaning forward or backwards the focus area may zoom in or out.

The 3D model of the person's body may also assist in correctly segmenting the body and the background. In addition to the model of the body, the segmentation method will learn what objects may be connected to the body, e.g., a person may be holding a phone, pen or paper in front of the camera. These objects will be segmented together with the person and added to the image in the virtual environment, either by using a model of that object or by transmitting the image of the object based on a pixel level representation. This may be in contrast to existing virtual background methods that may be employed in existing video conferencing solutions that may not show objects held by users as these objects are not segmented together with the person but rather as part of the background that has to be replaced by the virtual background.

Segmentation methods typically use some metric that needs to be exceeded in order for pixels to be considered as belonging to the same segment. However, the segmentation method may also use other approaches, such as Fuzzy Logic, where the segmentation method only outputs a probability that pixels belong to the same segment. If the method detects an area of pixels with a probability that makes it unclear if it and it is not sure whether the area should be segmented as part of the foreground or background, the user may be asked how to segment this area.

As part of the segmentation process, objects such as earphones, cables connected to the earphones, microphones, 3D glasses or VR headsets may be detected by a method. These objects may be removed in the modelling and rendering processes so that the image viewed by viewers does not include these objects. The option to show or eliminate such objects may be selected by users or may be determined in any other manner—for example based on selection previously made by the user, by other users, and the like.

If the method detects more than one person in the image, it may ask the user whether to include that person or people in the foreground and in the virtual 3D video conference environment or whether to segment them out of the image and outside of the virtual 3D video conference environment.

In addition to using the shape or geometrical features of objects in order to decide whether they may be part of the foreground or background, the method may also be assisted by knowledge about the temporal changes of the brightness and color of these objects. Objects that do not move or change have a higher probability of being part of the background, e.g., part of the room in which the user may be sitting, while areas where motion or temporal changes may be detected may be considered to have a higher probability of belonging to the foreground. For example, a standing lamp would not be seen as moving at all and it would be considered part of the background. A dog walking around the room would be in motion and considered part of the foreground. In some cases periodic repetitive changes or motion may be detected, for example where a fan rotates, and these areas may be considered to have a higher probability of belonging to the background.

The system will learn the preferences of the user and use the feedback regarding which objects, textures or pixels may be part of the foreground and which may be part of the background and use this knowledge in order to improve the segmentation process in the future. A learning method such as a Convolutional Neural Network or other machine learning method may learn what objects may be typically chosen by users as parts of the foreground and what objects may be typically chosen by users as part of the background and use this knowledge to improve the segmentation method.

The processing of this system may be performed on the user's device such as a computer, a phone or a tablet or on a remote computer such as a server on the cloud. The computations may also be divided and/or shared between the user's device and a remote computer, or they may be performed on the user's device for users with appropriate hardware and on the cloud (or in any other computation environment) for other users.

The estimation of the body and head parameters may be done based on compressed or uncompressed images. Specifically, they can be performed on compressed video on a remote computer such as a central computer on the cloud or another user's device. This would allow normal video conferencing systems to send compressed video to the cloud or another user's computer where all the modelling, rendering and processing would be performed.

Gaze Detection in Video Conferencing

Video conferencing is a leading method for executing meetings of all kinds. This is especially true with the globalization of working environments and has been enhanced with the appearance of the Covid-19 virus.

With the increase of importance of video conferencing systems, new methods of implementing them are being introduced. These include 3D environments, where the video conference appears to be held in a virtual setting. The participants also appear as 3D figures within the virtual environment, usually represented as avatars. In order for this kind of system to give participants a sensation of a real face-to-face meeting, it is important to understand where each participant is looking and to have the avatar look at the same place and with the same head orientation and movements as detailed below.

Prior art solutions are limited to understanding of where viewers look at the screen.

DOF—Degrees of Freedom

6 DOF—relative to a coordinate system, a person's head can have 6 degrees of freedom. Three of these are the X, Y and Z location of a predefined point in the head (e.g., the tip of the nose or the right extreme point of one of the eyes, etc.) The other three degrees of freedom are rotations around these axes. These are often known as Pitch, Yaw and Roll.

8 DOF— in addition to the 6 DOF, there are two additional degrees of freedom that help define a person's gaze. These additional degrees of freedom are necessary because the eyes do not necessarily look directly forward at all times.

Therefore, one needs to add two rotations of the eyes (Pitch and Yaw). In the most general case, one can say that each eye will have different values for these parameters.

Therefore, the most accurate description would actually be 10 DOF but for the sake of the document, only 8 DOF will be dealt with. In case a person looks at objects that are not in the immediate vicinity of the eyes, one can assume that both eyes have the same values for these parameters. The reduction from 10 DOF to 8 DOF can be done by averaging the values for both eyes or by taking the values of only one of the eyes. All that is written below can be applied to 10 DOF models.

There are known methods for determining where in the screen is the participant looking at. See for example http://developer.tobiipro.com/commonconcepts/calibration.html Solutions such as these only deal with understating at which point in the screen the viewer is looking. They are accomplished by calibrating the sight of the viewer as seen by the camera, with known coordinates of the screen.

Information about the screen size, or specifically the size of the window that is viewed by the viewer can be supplied by all operating systems or can be inferred by information about the screen size and window attributes within the screen.

In order to calculate the line of sight, one needs to find the 8 DOF parameters of the participant and combine that with the point on the screen with the participant is looking at.

The 6 DOF parameters can be obtained in the following manner: X and Y are relative to the camera's coordinates. Z can be obtained by one of the following methods:

a. For calibration purposes, ask the participant to sit at a defined distance from the camera. This is a one-time process. Following this, Z can be calculated by changes in the size of the head as viewed by the camera.

b. Use a depth camera. These are more and more ubiquitous nowadays.

c. Infer the participant's distance from the camera by the size of the participant's head as captured by the camera and compared to an average human's head size. Average numbers can be obtained, for example, here: https://en.wikipedia.org/wiki/Human_head d. Assume that the participant is located at a certain distance from the camera (e.g., 55 cm)

The three additional DOF are then easily obtained. This involves finding the Euclidean matrix which describes the movement of the head and is well known in computer graphics and in other areas.

The additional DOF for the eyes can then be found by comparing the pupil locations relative to the center of the eyes.

In order to calculate the line of sight, one assumes a virtual pinhole camera (VCV) located at the geometrical point which is on the participant's face between the participant's eyes. A line is then calculated which joins that virtual camera with the point on the screen the viewer is looking at. Note that, since we are dealing with a virtual 3D video conferencing setting, this virtual camera is also used as a virtual camera (VCP) when deciding what to present to the viewer on the viewer's screen from within the 3D environment. Therefore, the line of sight is also the line of sight within the 3D environment. Under some circumstances and in order to reduce the amount of changes of what is presented to the viewer, VCP may be less prone to movements than VCV and may be located at a slightly different location. Even in these cases, the location of VCP is known and it is straightforward to translate the viewers line of sight from VCV coordinates to a line of sight in the VCP coordinates.

Finding the line of sight is followed by determining what is the viewer looking at. This can be answered by finding the opaque object along the line of sight which is closest to VCV along the line of sight. In order to reduce possible miscalculations, it may be possible to assume that the viewer is looking at a face along or closest to the line of sight.

FIG. 8 illustrates an example where the first and second cameras VCV 4421 and VCP 4422 are mutually aligned. VCV 4421 has an optical axis 4426 and a VCV field of view 4423. VCP 4422 has an optical axis 4427 and a VCP field of view 4424.

FIG. 8 also illustrates avatars 4401, 4402, 4403, 4404 and 4405 of five participants within the virtual 3D video conference environment (V3DVCE), the display 4425 (as virtually appears in the V3DVCE), and an image 4410 that illustrates the displayed representation of the V3DVCE in which the five avatars are illustrated.

FIG. 9 illustrates an example where the first and second cameras VCV 4421 and VCP 4422 are misaligned but have their optical axes and field of views spaced apart but parallel to each other.

Figure 10:
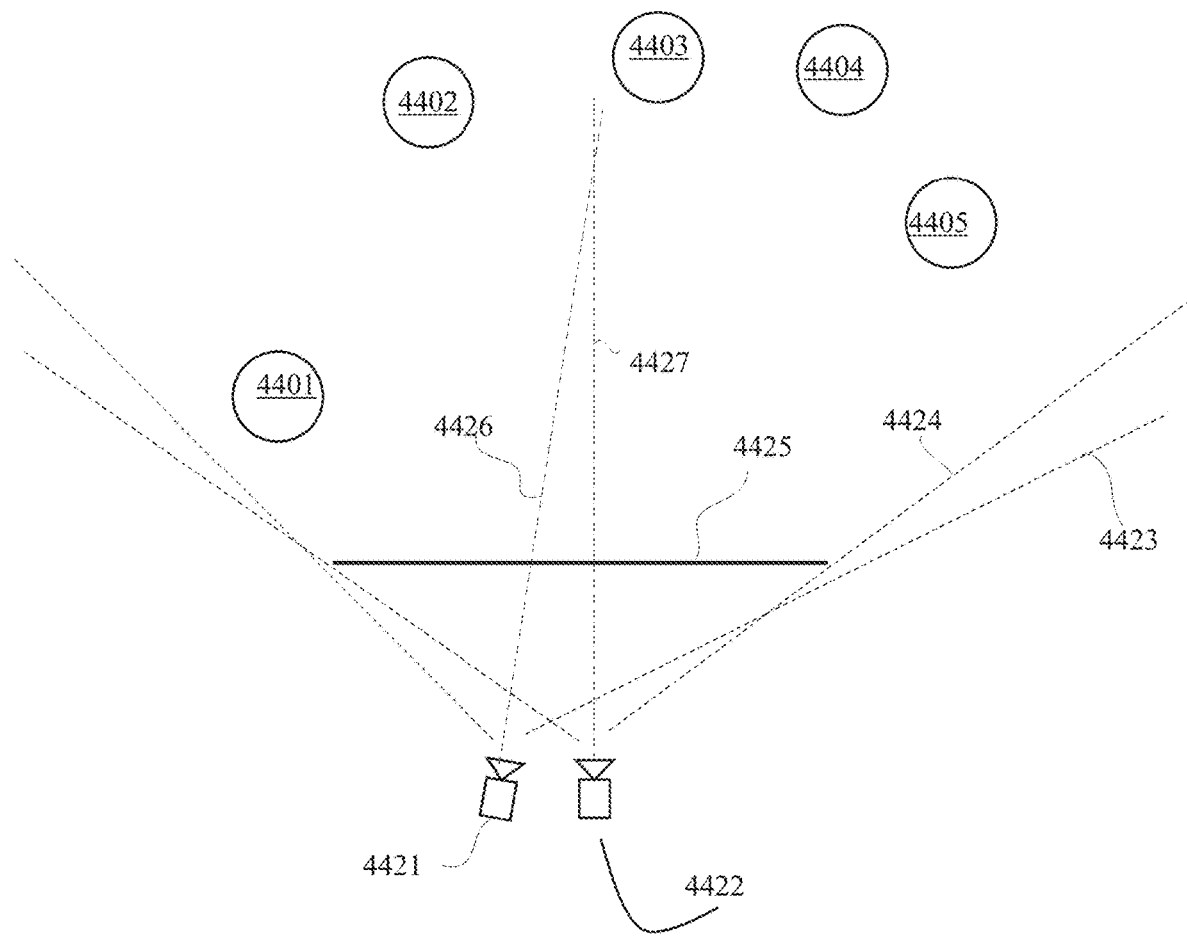
FIG. 10 illustrates two camera, fields of views of the two cameras, avatars and a displayed V3DVCE.

FIG. 10 illustrates an example where the first and second cameras VCV 4421 and VCP 4422 are misaligned but have their optical axes and field of views spaced apart and non-parallel to each other. Misalignment between the VCV and the VCP may occur. Misalignment between them may mean that the optical axis of the VCV is misaligned with the optical axis of the VCP. When this occurs, a gaze related object (or a part of said gaze related object) that can be fully seen by one camera, may be at least partially concealed from the other camera.

Figure 11:
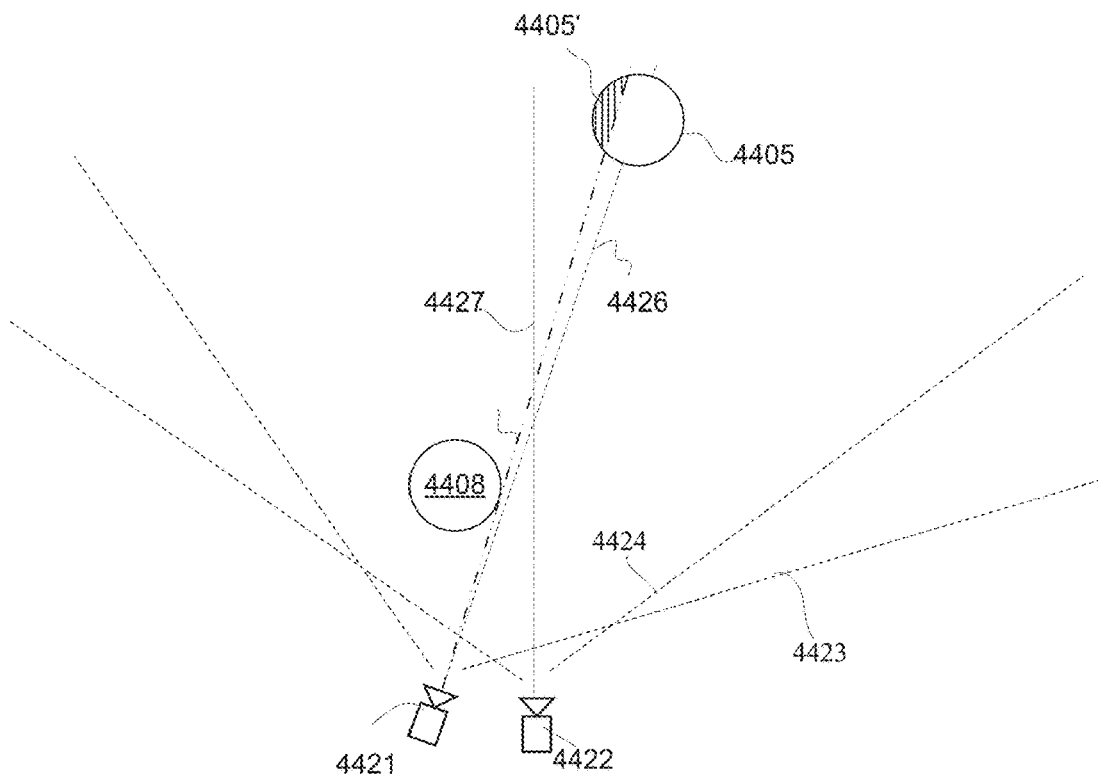
FIG. 11 illustrates two camera, fields of views of the two cameras, avatars and a displayed V3DVCE.

FIG. 11 illustrates an example where the first and second cameras VCV 4421 and VCP 4422 are misaligned, their optical axes and field of views spaced apart and non-parallel to each other, an avatar 4405 (example of a gaze related object) is fully seen by VCP 4422 and is partially concealed (part 4405' is not shown)—due to the presence of another gaze related object 4408.

Figure 12:
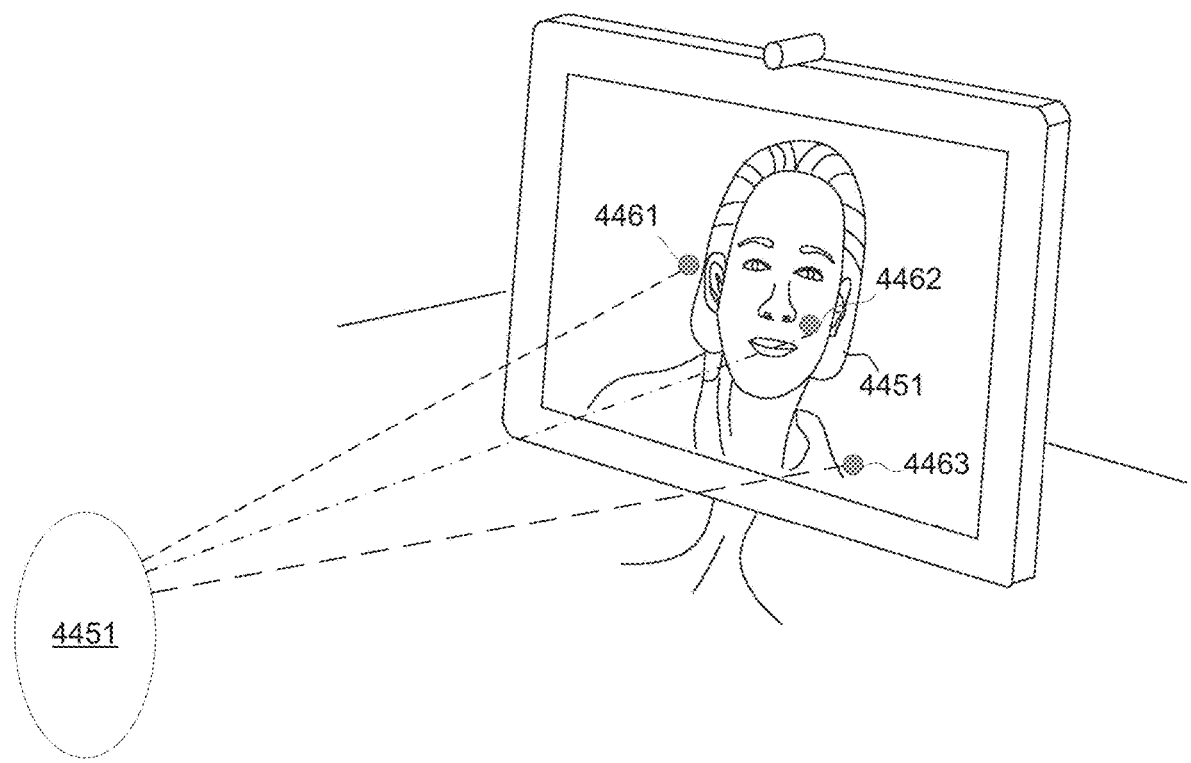
FIG. 12 illustrates a participant and an avatar.

FIG. 12 illustrates a participant 4451 that looks at three different points of time, at points 4461, 4462 and 4463 within the V3DVCE, point 4464 is positioned on the face of avatar 4451, points 4461 and 4463 are located in proximity to avatar 4451—and the method may conclude that the participant looks at the avatar 4451.

Figure 13:
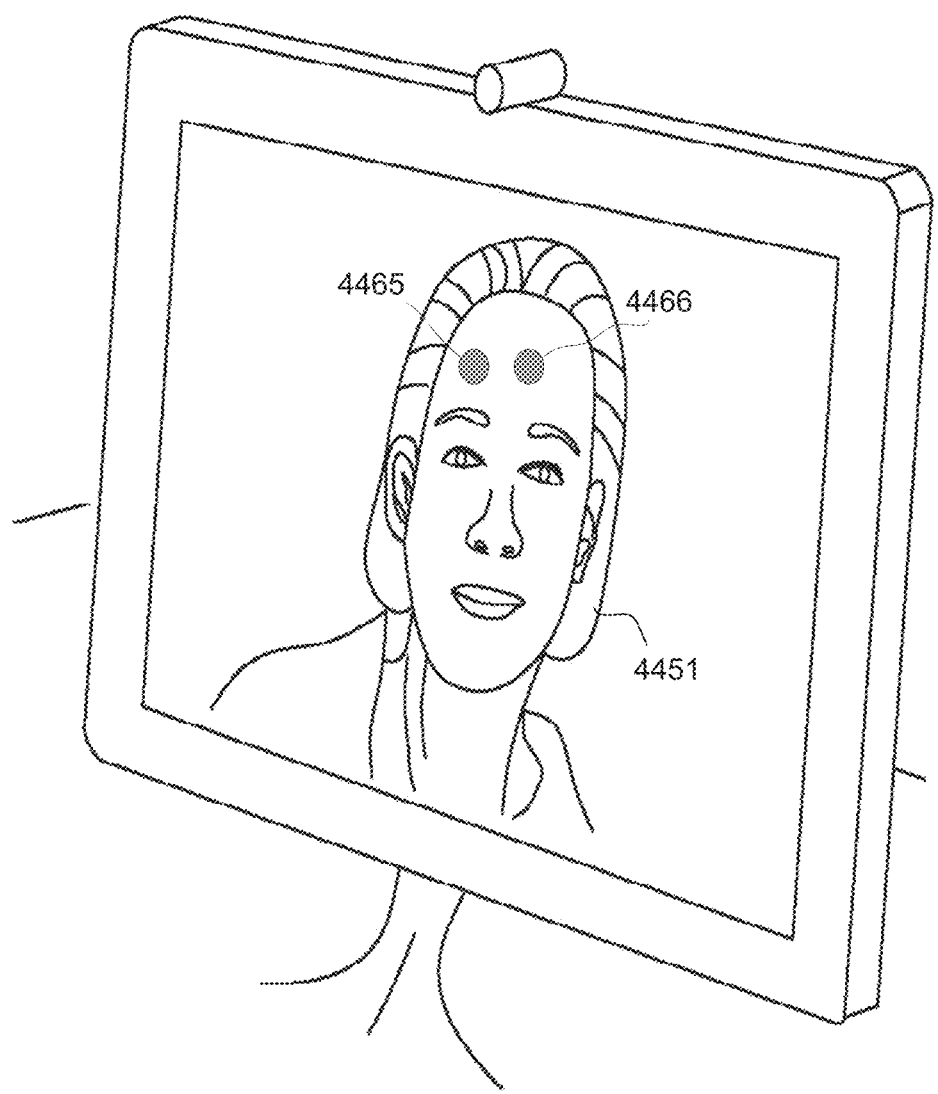
FIG. 13 illustrates points of gaze of a participant and an avatar.

FIG. 13 illustrates different points of gaze of a participant (appearing as points 4465 and 4465 on an avatar 4451 of another participant. The participant has its gaze oscillate between points 4465 and 4466 (on avatar 4451). By applying a temporal filter and/or smoothing—the gaze may be set (for purposes of generating the next displayed version of the V3DVCE) on one point—being one of the points, average point between points 4465 and 4466.

Figure 14:
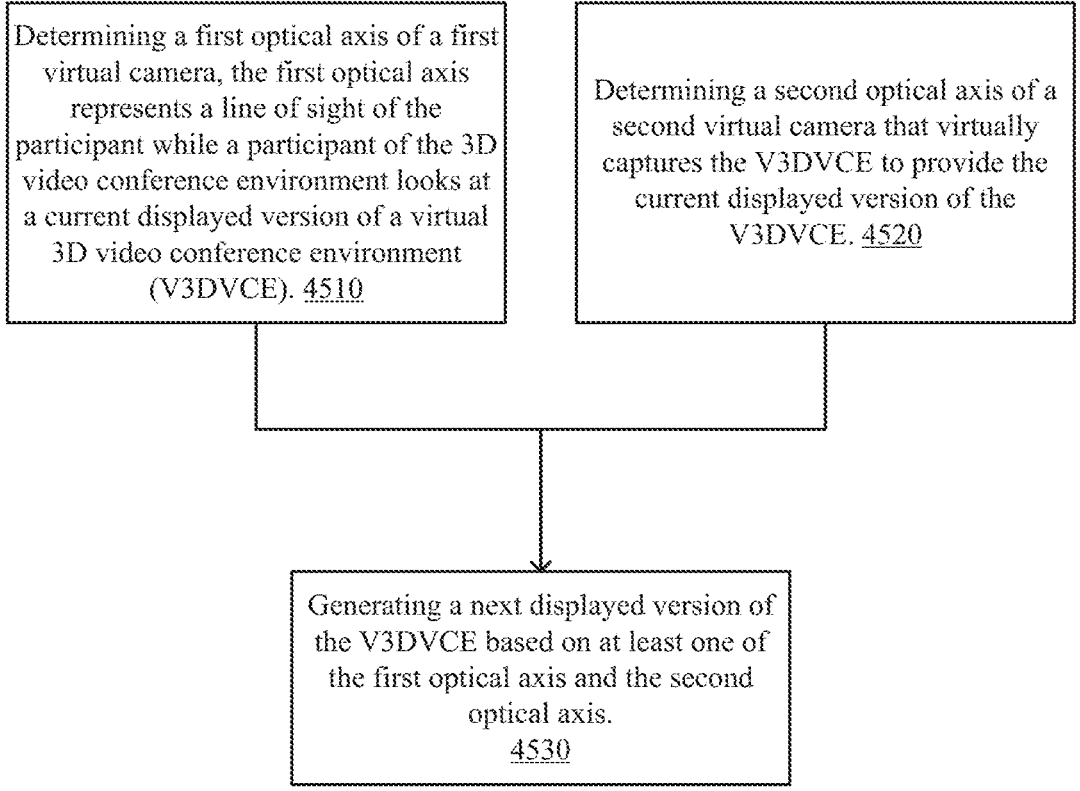
FIG. 14 illustrates an example of a method.

FIG. 14 illustrates method 4500 for virtual 3D video conference environment generation.

Method 4500 may start by steps 4510 and 4520.

Step 4510 may include determining a first optical axis of a first virtual camera, the first optical axis represents a line of sight of the participant while a participant of the 3D video conference environment looks at a current displayed version of a virtual 3D video conference environment (V3DVCE). A current displayed version of the V3DVCE is displayed on a display.

The first virtual camera may be virtually positioned at a geometrical point between both eyes of a participant and on a face of the participant.

Step 4510 may include at least one out of:
a. Applying a temporal filter on multiple intermediate determinations of the first optical axis, made during a certain time period.
b. Applying a smoothing operation on multiple intermediate determinations of the first optical axis, made during a certain time period.
c. Applying a temporal filter on multiple intermediate determinations of a second optical axis, made during the certain time period.

Step 4520 may include determining a second optical axis of a second virtual camera that virtually captures the V3DVCE to provide the current displayed version of the V3DVCE.

The V3DVCE may be displayed in correspondence to the second optical axis.

Steps 4510 and 4520 may be followed by step 4530 of generating a next displayed version of the V3DVCE based on at least one of the first optical axis and the second optical axis.

Steps 4510, 4520 and 4530 may be repeated multiple times—for example during the duration of the 3D video conference. Steps 4510, 4520, 4530 may be repeated each video frame, each multiple video frames, one to tens frames per second, once per second, once per multiple seconds, and the like.

Step 4530 may include at least one out of:
a. Comparing the second optical axis to the estimate of the line of sight of the participant within V3DVCE. The line of sight may have a first part outside the display.
b. The comparing may include calculating an estimate of the second optical axis outside the display.
c. Comparing the line of sight to the estimate of the second optical axis outside the display.
d. Determining an intersection pixel of the display that intersects with the first optical axis.
e. Searching for a potential object of interest that is virtually positioned within the V3DVCE in proximity to the line of sight within the V3DVCE, and determining a content of the next displayed version based on the potential object of interest. The potential object of interest may include an avatar. The potential object of interest may not be intersected by the line of sight.
f. Virtually amending the line of sight to virtually intersect with the potential object of interest.
g. Determining one or more gaze related objects. A gaze related object is an object that is located within a field of view of the participant, as represented by the direction of gaze of the participant.
h. Determining whether a gaze related object of the one or more gaze related objects at least partially conceals another gaze related object of the one or more gaze related objects. There may be an angular difference between the first optical axis and the second optical axis. The estimate of the first optical axis in the V3DVCE is an angular difference compensated estimate of the line of sight within the V3DVCE. Step 4530 may include compensating for an angular difference between the first optical axis and the second optical axis The one or more gaze related objects may include:
a. At least one object that intersects with the estimate of the first optical axis in the V3DVCE.
b. At least one object that is a face of an avatar of a participant that is located in proximity to the estimate of the first optical axis in the V3DVCE.
c. At least one object of interest within in the V3DVCE.

In the foregoing specification, the embodiments of the disclosure have been described with reference to specific examples of embodiments of the disclosure. It will, however, be evident that various modifications and changes may be made therein without departing from the broader spirit and scope of the embodiments of the disclosure as set forth in the appended claims.

Avatar Information Protection

Participants of a 3D video conference may be represented by avatars located in the V3DVCE. Examples of providing and maintaining a V3DVCE were illustrated in at least one out of (a) U.S. patent application Ser. No. 17/249,468 filing date Mar. 2, 2021, (b) U.S. provisional patent Ser. No. 63/023,836 filing date May 12, 2020, (c) U.S. provisional patent Ser. No. 63/081,860 filing date Sep. 22, 2020, (d) U.S. provisional patent Ser. No. 63/199,014 filing date Dec. 1, 2020, (e) U.S. patent application Ser. No. 17/304,378 filing date Jun. 20, 2021, or (f) U.S. patent application Ser. No. 17/539,036 filing date Nov. 30, 2021, all being incorporated herein by reference. Other V3DVCEs may be provided.

There is a need to control the distribution of avatars of participants—especially highly accurate avatars of participants—or avatars that may expose information regarding the participant.

Figure 15A:
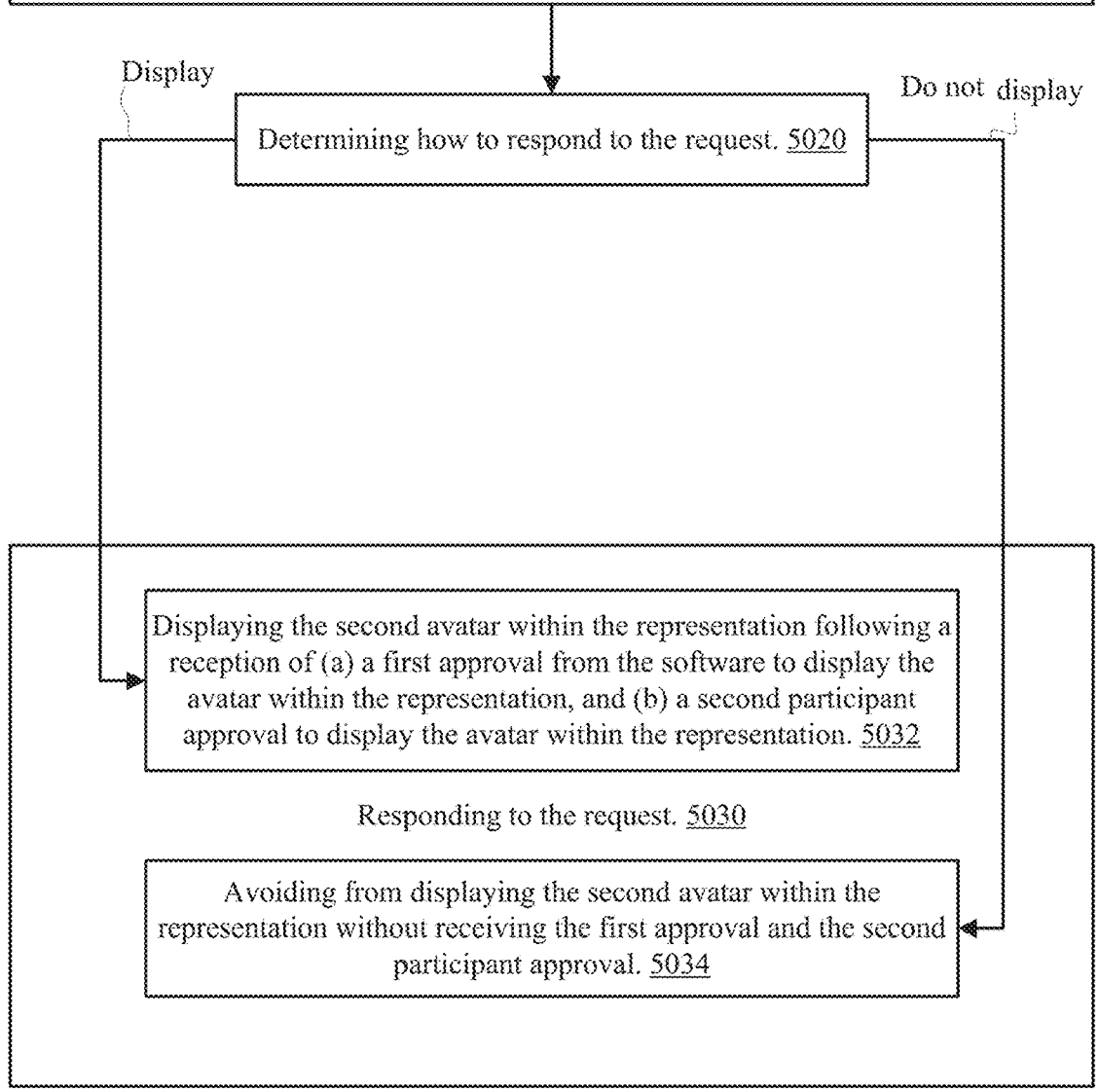
FIG. 15A illustrates an example of a method.

FIG. 15A illustrates an example of a method 5000 for conducting a three dimensional (3D) video conference with multiple participants.

Method 5000 may start by step 5010 of receiving, from a first participant and by software used to conduct the 3D video conference call, a request to see a second avatar that represents a second participant, within a representation of a virtual 3D environment displayed to the first participant during the 3D video conference. The virtual 3D environment may be the V3DVCE or may differ from the V3DVCE.

The software used to conduct the 3D video conference call may reside in the device of the first participant, in a device of the second participant—or elsewhere—for example in a central server.

Step 5010 may be followed by step 5020 of determining how to respond to the request.

The determining may include at least one out of:
a. Determining only whether or not to display the second avatar—may require a second participant approval.
b. Determining a manner in which the second avatar is displayed—for example one or more appearance parameter (resolution and/or color plate and/or brightness, and the like). For example—displaying an a default second virtual element that represents the second participant at an absence of the first approval and the second participant approval. The default second virtual element may represent any group of persons or may not be tailored to the second avatar in any other manner—or may not identify the second person.
c. Determining one or more additional parameter of the second avatar—for example a manner in which the second avatar moves (for example—smoothness of movement, types of movement, scope of movement—especially which body organs will participant in each movement), and the like.

Obtaining an approval of the second participant to the manner in which the avatar is displayed and/or moved may require additional approvals and/or requests—or may be resolved by the second participant approval itself.

Step 5020 requires an approval from the second participant. The approval may be provided in various manners—for example may be provided in advance—even before the request—or may be provided following the request.

For example—the second participant may define second participant avatar usage rules that govern the usage of the avatar of the second participant.

A second participant avatar usage rule may limit the usage and/or allow the usage—based on one or more parameters such as but not limited to the identity of the first participants, any other parameter related to the first participant (age, gender, any demographic parameter), any parameter related to one or more other participants (not the first or second participants) of the virtual 3D environment, the time of conduction of the 3D conference call, the topic of the virtual 3D environment, and the like.

A second participant avatar usage rule may define the manner the avatar is displayed and/or moves.

The second participant may update the second participant avatar usage rules over time. The second participant avatar usage rules may be stored in any manner—for example in a secure location—for example a location under any hardware and/or software cyber protection.

The second participant avatar usage rules software used to conduct the 3D video conference call may be accessible by the software used to conduct the 3D video conference call.

Alternatively—the second participant may be asked (for example by the software used to conduct the 3D video conference call) to provide a response—following the reception of the request. The second participant may be asked to provide a response at an absence of any second participant avatar usage rules, when there is no second participant avatar usage rule that covers a situation related to the request (for example—no rule regarding sharing the second avatar with the first participant), or when at least a certain period of time (defined by the second participant or defined by any other entity—for example a day, a week, a month, a year, and the like) passed from the last time the first participant (or any other participant) requested to display the avatar of the second participant.

The software used to conduct the 3D video conference call may determine, based on the second participant avatar usage rules, whether there is a need to contact the second participant—and if not—may determine not to contact the second participant.

Step 5020 may include at least one out of:
a. Determining whether to generate the second participant approval by the software, based on one or more second participant avatar usage rules provided by the second participant. And responding to the determining—sending a request or not sending the request.
b. Requesting, by the software and from the second participant, the second approval at an absence of the one or more second participant avatar usage rules.
c. Requesting, by the software and from the second participant, the second approval, following a reception of the request.
d. Determining, at an absence of the first approval and the second approval, to display a Step 5020 may also include requesting a first approval from the software to display the avatar of the second participant within the representation.

Step 5020 may be followed by step 5030 of responding to the request—according to the determining of step 5020.

If determining, during step 5020, to display the second avatar within the representation—then step 5020 may be followed by step 5032 (of step 5030) of displaying the second avatar within the representation following a reception of (a) a first approval from the software to display the avatar within the representation, and (b) a second participant approval to display the avatar within the representation.

Step 5032 may be executed following a manner approved by the second participant for displaying second avatar and/or may be executed by following one or more additional parameter related to the display of the second avatar—for example a manner in which the second avatar moves and the like.

If determining, during step 5020, not to display the second avatar within the representation—then step 5020 may be followed by step 5034 (of step 5030) of avoiding from displaying the second avatar within the representation. The second avatar may be displayed only after receiving the first approval and the second participant approval.

Figure 15B:
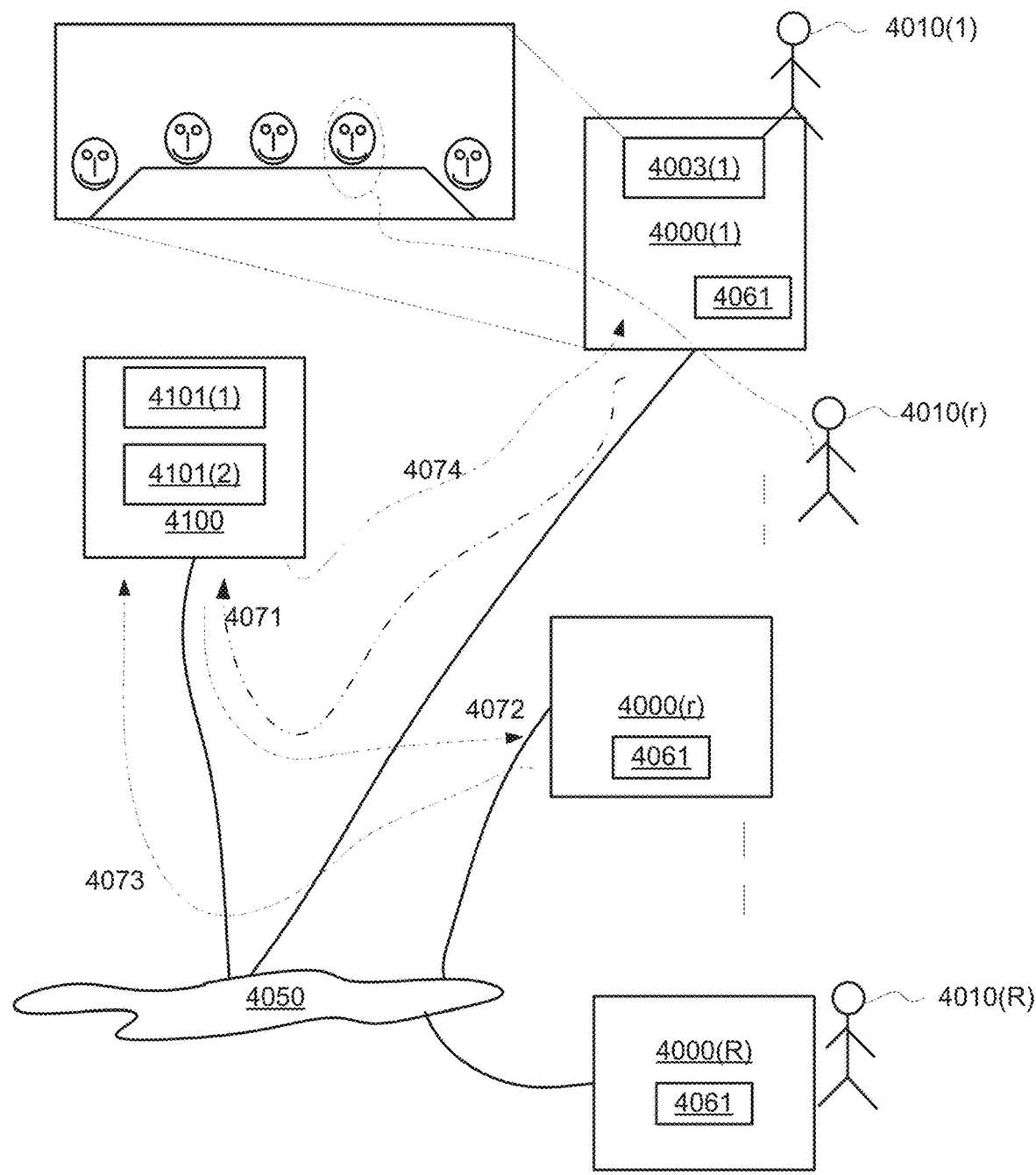
FIGS. 15B-15F illustrate various scenarios.

FIG. 15B illustrates an example of a computational environment that includes users devices 4000(1)-4000(R) of users 4010(1)-4010(R). Index r ranges between 1 and R, R being a positive integer. The r'th user device 4000(r) may be any computerized device that may include one or more processing circuit, a memory, a man machine interface such as a display 4000(3), and one or more sensors such as camera. The r'th user 4010(r) is associated with (uses) the r'th user device 4000(r). The camera may belong to the man machine interface.

The users devices 4000(1)-4000(R) and a remote computerized system 4100 may communicate over one or more networks such as network 4050. The one or more networks may be any type of networks—the Internet, a wired network, a wireless network, a local area network, a global network, and the like.

The remote computerized system may include one or more processing circuits 4101(1), a memory 4101(2), and may include any other component.

A first user 4010(1) requests to display an avatar of the second participant 4010(r) to be displayed on a display 4003(1) of the first user device. The first user device sends a request 4071 to a software.

In FIG. 15B the software used to conduct the 3D video conference call has an agent 4061 installed in the users devices and also has a main software component 4062 which resides in the remote computerized system 4100 and may request (see request 4072) the second participant (via his user device 4000(r)) to approve the display of the avatar of the second participant on display 4003(1).

In FIG. 15B the software sends the request to the second participant—and the second participant approves (approval 4073) the display—and the software informs (decision 4074) that a display of the avatar of the second participant is approved.

Figure 15C:
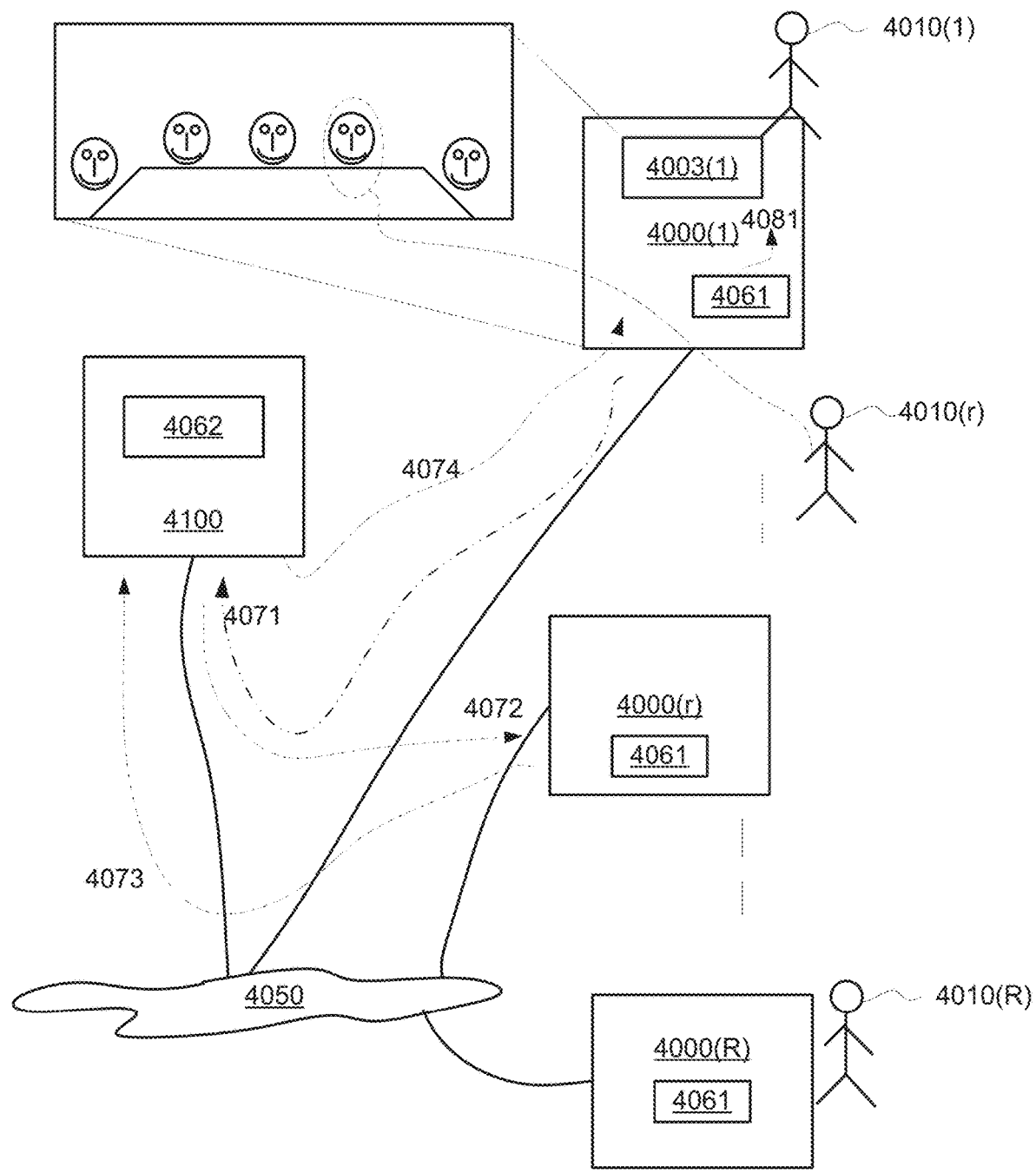

FIG. 15C differs from FIG. 15B by illustrating the approval 4081 of the software used to conduct the 3D video conference call to display the second avatar. The software used to conduct the 3D video conference call may refuse to display the avatar of the second participant for various reasons—for example software limitations, hardware limitations, bandwidth limitations, overload, and the like.

Figure 15D:
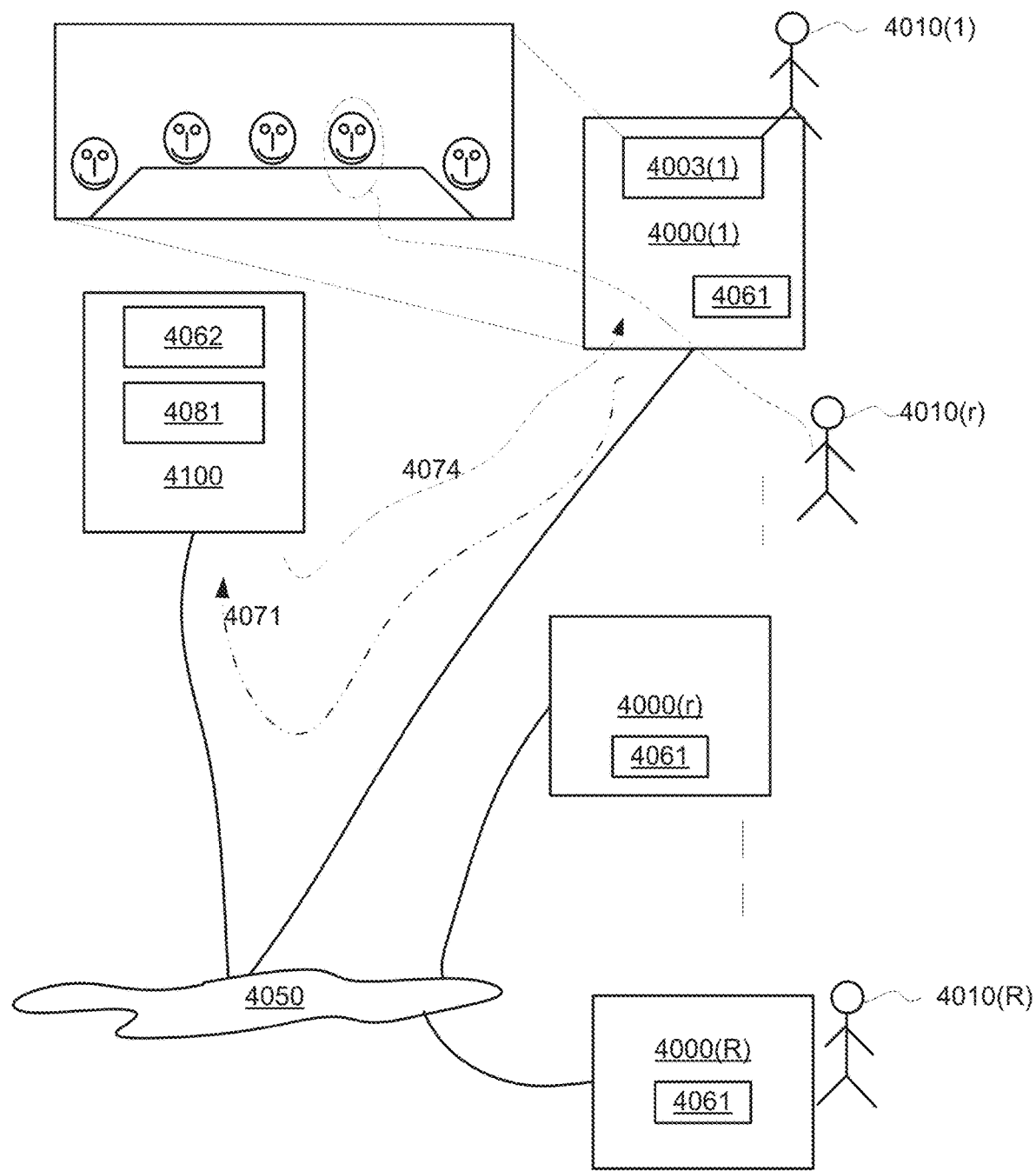

FIG. 15D illustrates a scenario in which the software decides to allow usage of the avatar of the second participant based on second participant avatar usage rules 4081 stored in the remote computerized system and there is no need to ask the second participant. See request 4071 and approval 4074.

Figure 15E:
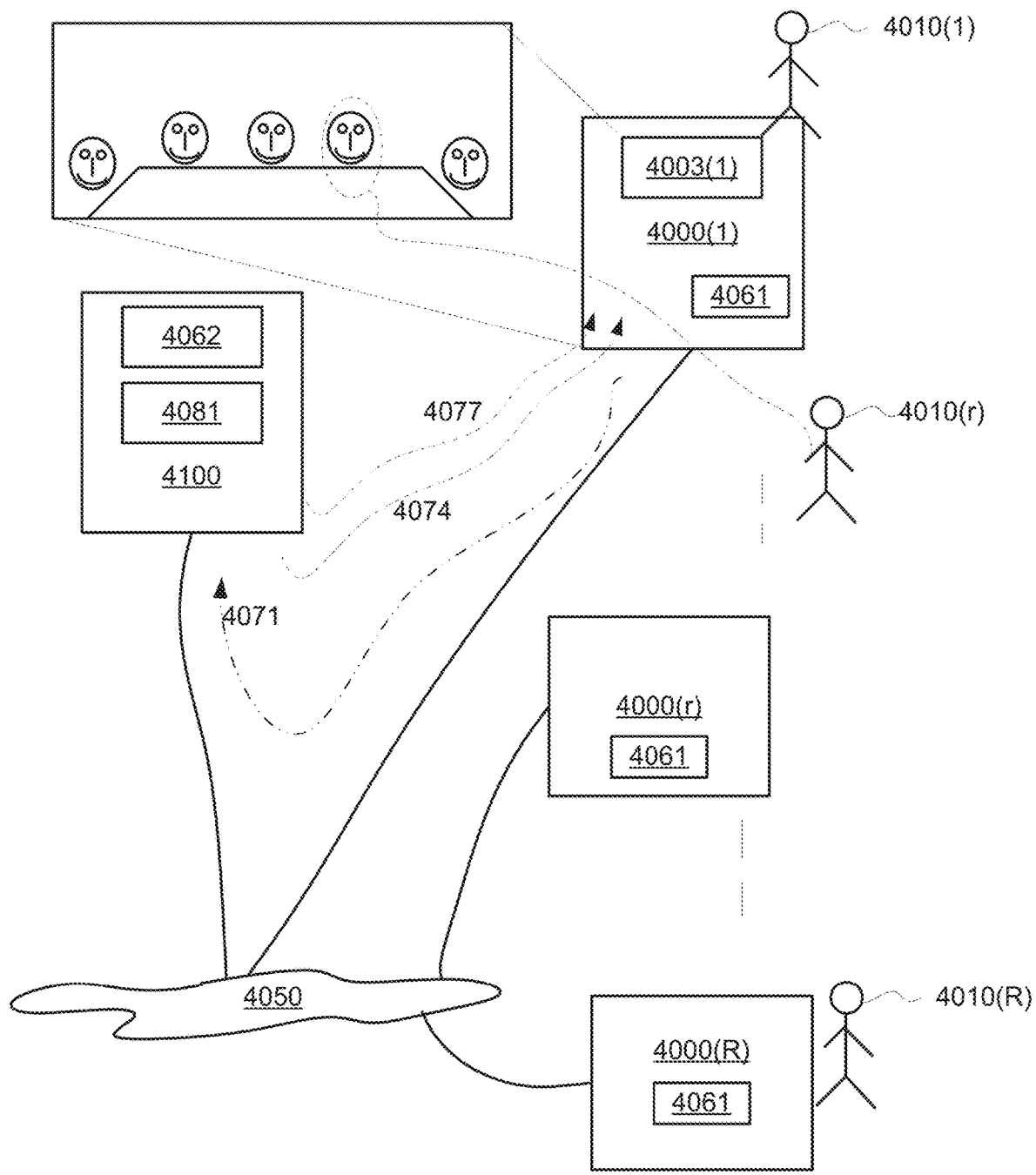

FIG. 15E differs from FIG. 15D by illustrating an additional approval 4077 that may determine the manner in which the avatar is displayed and/or moves.

Figure 15F:
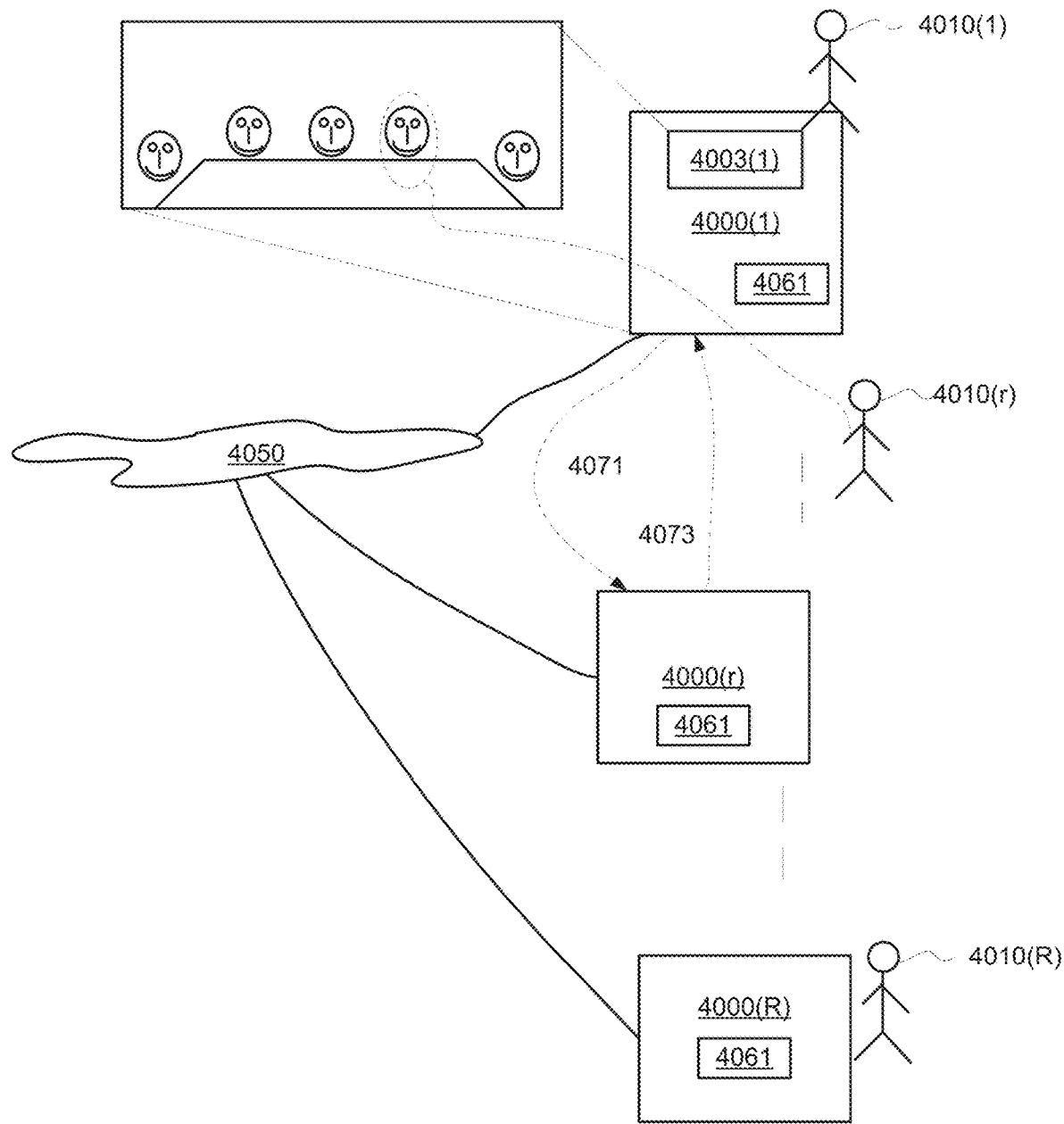

FIG. 15F illustrates an example of a computational environment that includes users devices 4000(1)-4000(R) of users 4010(1)-4010(R). Index r ranges between 1 and R, R being a positive integer. The r'th user device 4000(r) may be any computerized device that may include one or more processing circuit, a memory, a man machine interface such as a display, and one or more sensors such as camera. The r'th user is associated with (uses) the r'th user device. The users devices 4000(1)-4000(R) may communicate over one or more networks such as network 4050.

Any one of the users devices 4000(1)-4000(R) may participate in the execution of any method illustrated in the specification. Participate means executing at least one step of any of said methods.

In FIG. 15F the user makes the request that is sent (4071) from the user device 400(1) to the r'th used device (via network 4050) and the second participant (via his user device) sends an approval 4073.

Animation Based on Skeletal Movement

It is important to render avatars which appear as natural as possible and have them appear in the virtual environment just like real people in real environments. The system which creates and animates the avatars may need to be able to also create and animate the avatars' hands and arms in such a way that would fulfil two important tasks. One is to replicate the movements of the real human participant. The other is to animate the avatar's hand and arm movements and gestures in a natural way.

Modeling hands and arms is known in the art. Usually, the model includes a number of independent joints. The joints are defined by the points where the joints connect to each other. Such models, for hands alone, typically vary between 15 and 25 points. A Model-based Deep Hand Pose Estimation is based on forwards kinematic layer to ensure the geometric validity of estimated poses.

Similarly, modeling arms includes points which define the location of the wrist, elbow and shoulder. Such a skeletal model is easy to track in order to understand hand and arm gestures and can be done with simple, inexpensive cameras.

Various prior art methods for tracking hand movements require physically attaching markers to a person and tracking these markers. These markers are located on the skin of the person and therefore are not co-located with the points of the skeletal model.

There is a need to provide an efficient tracking method for tracking hand movement that does not require to physically attach markers to the skin of a person. The method uses hand tracking models in order to animate avatars hands and arms so they perform the same actions as the persons they represent, for example, in video conferencing environments.

Tracking arm movement of a person includes acquiring images of the arm and converting the images to movements of a skeletal model of the arm. Any prior art method for converting arm movement to movements of a skeletal model of the arm may be applied.

The movements of the skeletal model are translated to movement of an arm of the avatar—especially the movements and relative movement of the joints (as represented by the skeletal movement of the arm), which are inferred by the tracking system, are used by a computerized entity that animates and renders the avatars. However, merely replicating the movement of the joints onto the avatar may not be enough in order to render a natural-looking movement.

Consider what happens when a wrist turns around the imaginary axis which connects the elbow and the wrist. Such a hand movement should result in a considerable change in the appearance of the arm between the elbow and the wrist although the location of both may be fixed in space. In other words, the movement of some of the joints may not result in a movement of other joints but should result in changes in the 3D appearance of other parts, or in their apparent texture. This is because the movement of different joints, affects muscle movement and also skin appearance although both muscles and skin are not part of the skeletal model.

To overcome this, the computerized entity that renders and animates the avatar, should understand how joint movement result in texture and muscle movement.

The suggested method uses a machine learning system which learns how joint movements influence texture and muscle movement. This can be taught by using video clips of the specific person performing movements or by learning from any group of people, or learning from one person and then using the learned model when applying it to animation of avatars of other persons.

Figure 16A:
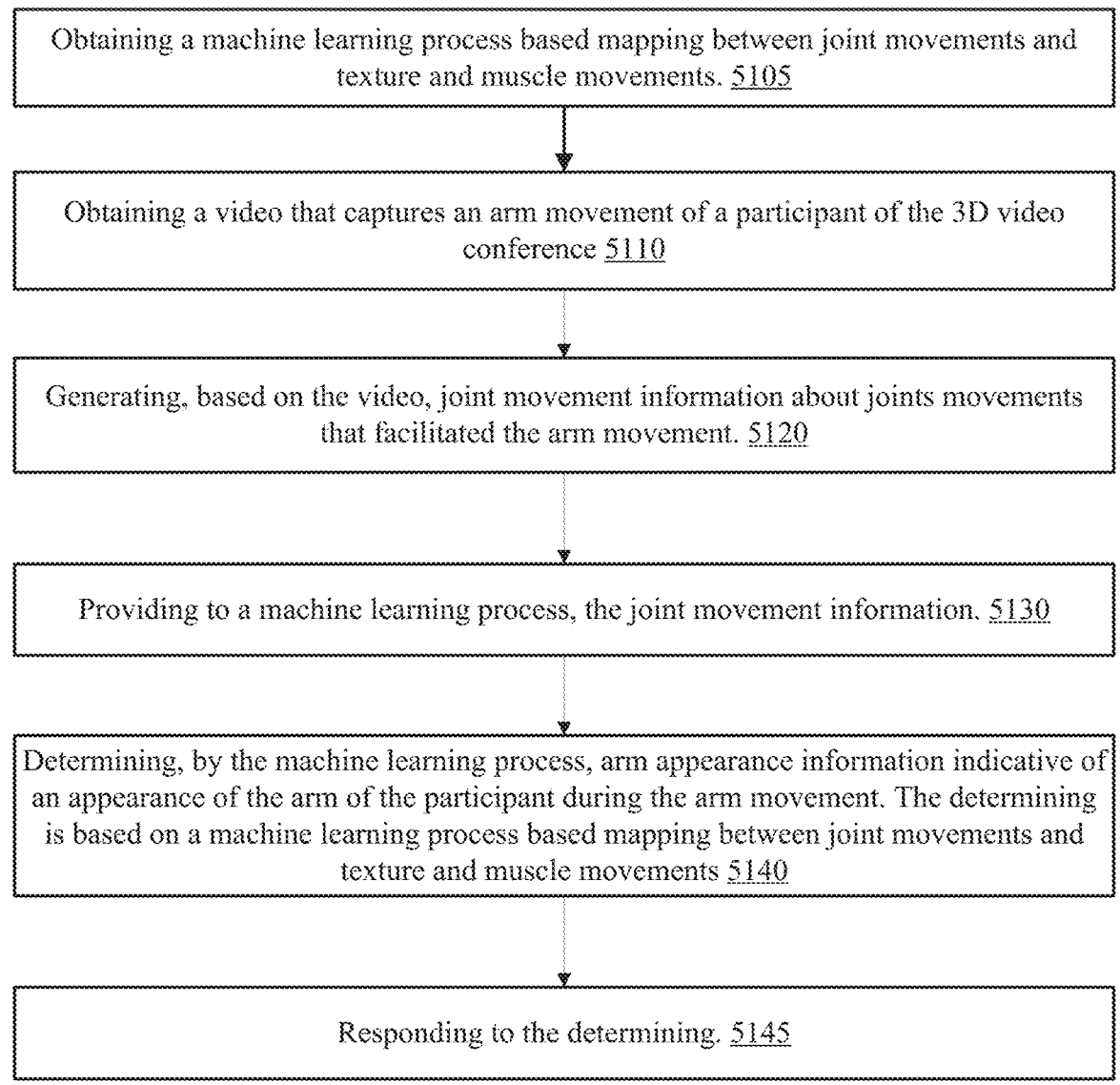
FIG. 16A illustrates an example of a method.

FIG. 16A illustrates an example of method 5100 for virtually mimicking an arm movement of participant of the three dimensional (3D) video conference.

Method 5100 may start by initializing step 5105 of obtaining a machine learning process based mapping between joint movements and texture and muscle movements. A machine learning process may be trained to generate the machine learning process based mapping. The obtaining may include training the machine learning process or receiving a trained machine learning process.

Step 5105 may include training the machine learning process to generate the machine learning process based mapping. The training may be based on videos of arm movements of a specific participant. The training may be based on videos of arm movements of a group of persons.

Step 5105 may be followed by step 5110 of obtaining a video that captures an arm movement of a participant of the 3D video conference.

Step 5110 may be followed by step 5120 of generating, based on the video, joint movement information about joints movements that facilitated the arm movement.

Step 5120 may be followed by step 5130 of providing to a machine learning process, the joint movement information.

Step 5130 may be followed by step 5140 of determining, by the machine learning process, arm appearance information indicative of an appearance of the arm of the participant during the arm movement. The determining is based on a machine learning process based mapping between joint movements and texture and muscle movements.

Step 5140 may include changing the arm appearance information even when the arm movement is limited to a rotation about a joint.

Step 5140 may be followed by step 5145 of responding to the determining.

Step 5145 may include rendering an avatar of the participant based on the arm appearance information.

Step 5145 may include storing the arm appearance information.

Step 5145 may include sending the arm appearance information to another computerized device related to the 3D video conference.

Step 5145 may include a combination of at least two out of (a) rendering an avatar of the participant based on the arm appearance information, (b) storing the arm appearance information, or (c) sending the arm appearance information to another computerized device related to the 3D video conference.

Step 5145 may consist essentially of only one out of (a) rendering an avatar of the participant based on the arm appearance information, (b) storing the arm appearance information, or (c) sending the arm appearance information to another computerized device related to the 3D video conference.

Figure 16B:
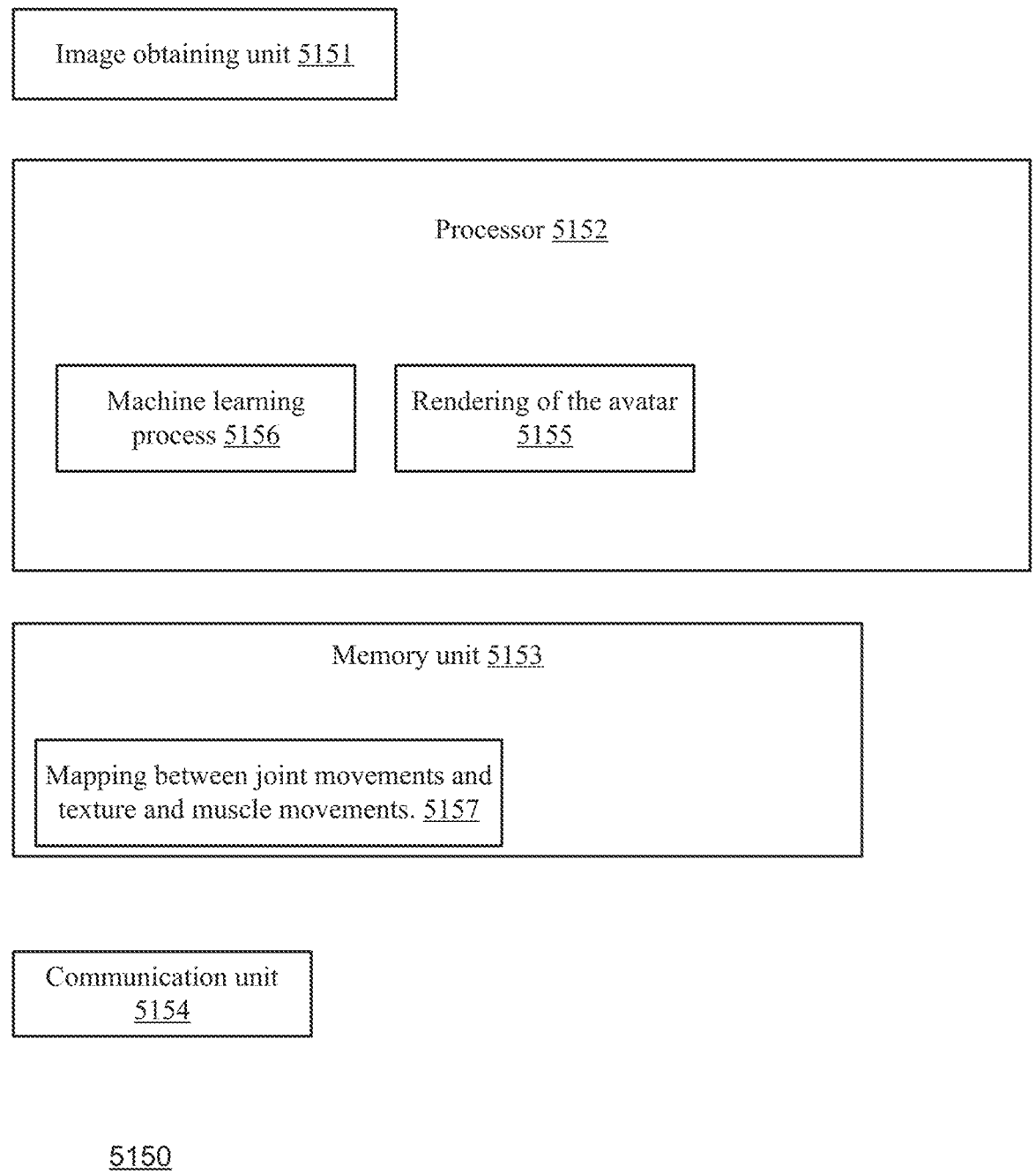
FIG. 16B illustrates an example of a computerized system.

FIG. 16B illustrates an example of computerized system 5150 for virtually mimicking an arm movement of a participant of the three dimensional (3D) video conference. The computerized system includes (a) images obtaining unit 5151 configured to obtain images of at least an arm and connected hand of a person (the images obtaining unit may be a sensor such as a camera, or an interface or a communication unit for receiving the images), a processor 5152, a memory unit 5153 and a communication unit 5154.

The processor 5152 may implement the machine learning process (5156) and/or may perform the rendering (5155) of the avatar.

FIG. 16B also illustrates the mapping (5157) between joint movements and texture and muscle movements. It should be noted that the mapping may be reflected by the machine learning process—for example may be implemented by the weights of a neural network that may be used to apply the machine learning process.

Hand Modeling and Avatar Animation

It is important to render avatars which appear as natural as possible and have them appear in the virtual environment just like real people in real environments. The system which creates and animates the avatars may need to be able to also create and animate the avatars' hands and arms in such a way that would fulfil two important tasks. One is to replicate the movements of the real human participant. The other is to animate the avatar's hand and arm movements and gestures in a natural way.

Modeling hands and arms is known in the art. Usually, the model includes a number of independent joints. The joints are defined by the points where the joints connect to each other. Such models, for hands alone, typically vary between 15 and 25 points. A Model-based Deep Hand Pose Estimation is based on forwards kinematic layer to ensure the geometric validity of estimated poses.

Similarly, modeling arms includes points which define the location of the wrist, elbow and shoulder. Such a skeletal model is easy to track in order to understand hand and arm gestures and can be done with simple, inexpensive cameras.

Animating avatars, is typically done by using markers which are attached to the bodies of the persons whose avatar is created. In the case of hands, markers are attached to the hands at different places. As the person moves, a capturing system captures the movements of the markers and then uses these movement in order to animate the avatars.

The captured movement are acquired from certain points of view.

There is a growing need to provide an efficient method for generating avatars which may provide an avatar without using physical markers—and that can be viewed from any point of view.

The suggested method uses hand tracking models in order to animate avatars' hands so they perform the same actions as the humans that they represent, for example, in video conferencing environments.

Tracking may be performed by a camera and different possible methods as described in the art. The movements and relative movement of the joints which may be inferred by the tracking system may be then passed on to the system which animates and renders the avatars. In this way, once a 3D model of the hand and joints movements may be created, the avatar's hands can be rendered as being seen from any view point in a realistic way, which accurately reflects the movements of the person whose avatar may be being created.

Figure 17A:
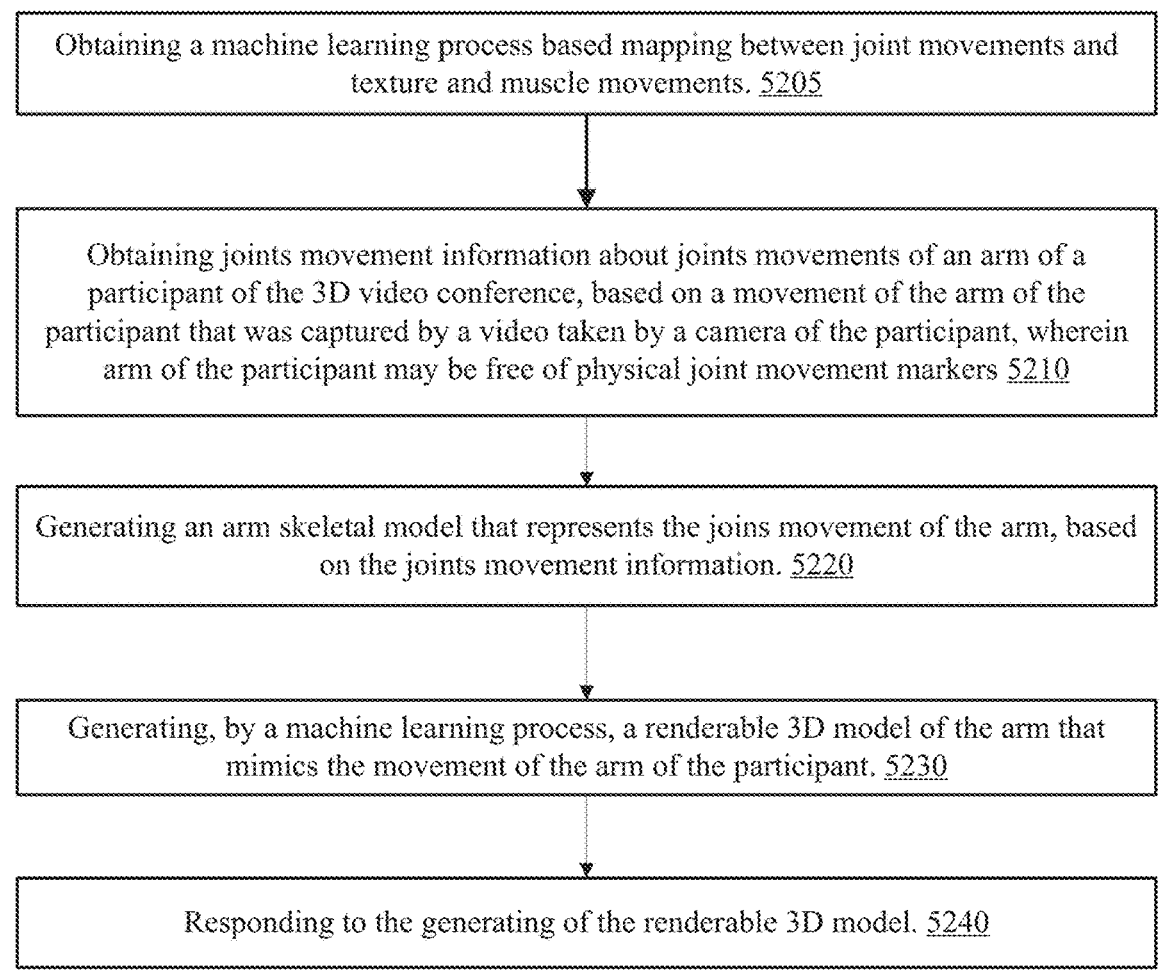
FIG. 17A illustrates an example of a method.

FIG. 17A is an example of method 5200 for virtually mimicking an arm movement of participant of the three dimensional (3D) video conference.

Method 5200 may start by initializing step 5205 of obtaining a machine learning process based mapping between joint movements and texture and muscle movements. A machine learning process may be trained to generate the machine learning process based mapping. The obtaining may include training the machine learning process or receiving a trained machine learning process.

Step 5205 may include training the machine learning process to generate the machine learning process based mapping. The training may be based on videos of arm movements of a specific participant. The training may be based on videos of arm movements of a group of persons.

Step 5205 may be followed by step 5210 of obtaining joints movement information about joints movements of an arm of a participant of the 3D video conference, based on a movement of the arm of the participant that was captured by a video taken by a camera of the participant, wherein arm of the participant may be free of physical joint movement markers.

Step 5210 may be followed by step 5220 of generating an arm skeletal model that represents the joins movement of the arm, based on the joints movement information.

Step 5220 may be followed by step 5230 of generating, by a machine learning process, a renderable 3D model of the arm that mimics the movement of the arm of the participant. Step 5230 may be executed by the same machine learning process that executed step 5220. Alternatively—step 5230 may be executed by the a machine learning process that differs from the machine learning process that executed step 5220.

The renderable 3D model may be renderable from any point of view.

Step 5230 may be followed by step 5240 of responding to the generating of the renderable 3D model. The responding may include rending the renderable 3D model.

Step 5230 may include rendering an avatar of the participant based on the renderable 3D model.

Step 5230 may include storing renderable 3D model information.

Step 5230 may include sending the renderable 3D model information to another computerized device related to the 3D video conference.

Step 5230 may include only one out of (a) rendering an avatar of the participant based on the renderable 3D model, (b) storing renderable 3D model information, or (c) sending the renderable 3D model information to another computerized device related to the 3D video conference.

Step 5230 may include a combination of at least two out of (a) rendering an avatar of the participant based on the renderable 3D model, (b) storing renderable 3D model information, or (c) sending the renderable 3D model information to another computerized device related to the 3D video conference.

FIG. 17B illustrates an example of computerized system 5250 for virtually mimicking an arm movement of participant of the three dimensional (3D) video conference. The computerized system includes (a) joints movement information obtaining unit 5251 configured to obtain joints movement information related to an arm of a person (the joints movement information obtaining unit may generate the joints movement information obtaining unit or may receive the joints movement information obtaining unit, the joints movement information obtaining unit may include sensor such as a camera and a processor for generating the obtaining joints movement information from the images, or an interface or a communication unit for receiving the images or the obtaining joints movement information), a processor 5252, a memory unit 5253 and a communication unit 5255.

The processor 5252 may implement the machine learning process (5256) and/or may perform the rendering (5254) of the avatar.

FIG. 17B also illustrates the mapping (5257) between joint movements and texture and muscle movements. It should be noted that the mapping may be reflected by the machine learning process—for example may be implemented by the weights of a neural network that may be used to apply the machine learning process.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The connections as discussed herein may be any type of connection suitable to transfer signals from or to the respective nodes, units, or devices, for example via intermediate devices. Accordingly, unless implied or stated otherwise, the connections may for example be direct connections or indirect connections. The connections may be illustrated or described in reference to be a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above-described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments of the disclosure s containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiments of the disclosure.

I claim:

1. A method for conducting a three dimensional (3D) video conference with multiple participants, the method comprises:
   receiving, from a first participant and by a processor comprising computer-executable instructions used to conduct the 3D video conference call, a request to see a second avatar that represents a second participant, within a representation of a virtual 3D environment displayed to the first participant during the 3D video conference;
   displaying the second avatar within the representation following a reception of (a) a first approval from the computer-executable instructions to display the avatar within the representation, and (b) a second participant approval to display the avatar within the representation;
   generating the second participant approval by the computer-executable instructions, based on one or more second participant avatar usage rules provided by the second participant, and requesting, by the computer-executable instructions and from the second participant, the second approval at an absence of the one or more second participant avatar usage rules; and
   avoiding from displaying the second avatar within the representation until receiving the first approval and the second participant approval.

2. The method according to claim 1 comprising requesting, by the computer-executable instructions and from the second participant, the second approval, following a reception of the request.

3. The method according to claim 1 comprising conditioning the first approval by an approval of the first participant to see a first avatar that represents the first participant within a representation of the virtual 3D environment displayed to the second participant during the 3D video conference.

4. The method according to claim 1 comprising displaying a default second virtual element that represents the second participant at an absence of the first approval and the second participant approval.

5. The method according to claim 4 wherein the default second virtual element is a non-participant specific avatar.

6. The method according to claim 1 wherein the first approval and the second participant approval also include an approval to perform one or more operations regarding the second avatar within the representation.

7. The method according to claim 6 wherein the one or more operations comprises moving the avatar.

8. The method according to claim 6 wherein the one or more operations comprises moving the second avatar to track a direction of gaze of the second participant.

9. The method according to claim 1 wherein the first approval and the second participant approval also include an approval to apply one or more display parameter regarding the second avatar within the representation.

10. The method according to claim 9 wherein the one or more display parameters comprise a resolution.

11. The method according to claim 1 comprising requesting another second participant approval that is related to a manner in which the second avatar is displayed.

12. A non-transitory computer readable medium for conducting a three dimensional (3D) video conference with multiple participants, the non-transitory computer readable medium that stores computer-executable instructions for:
   receiving, from a first participant and by the computer-executable instructions used to conduct the 3D video conference call, a request to see a second avatar that represents a second participant, within a representation of a virtual 3D environment displayed to the first participant during the 3D video conference;
   displaying the second avatar within the representation following a reception of (a) a first approval from the computer-executable instructions to display the avatar within the representation, and (b) a second participant approval to display the avatar within the representation;
   generating the second participant approval by the computer-executable instructions, based on one or more second participant avatar usage rules provided by the second participant, and requesting, by the computer-executable instructions and from the second participant, the second approval at an absence of the one or more second participant avatar usage rules; and
   avoiding from displaying the second avatar within the representation until receiving the first approval and the second participant approval.

13. The non-transitory computer readable medium according to claim 12 that stores the computer-executable instructions for requesting, by the computer-executable instructions and from the second participant, the second approval, following a reception of the request.

14. The non-transitory computer readable medium according to claim 12 that stores the computer-executable instructions for conditioning the first approval by an approval of the first participant to see of a first avatar that represents the first participant within a representation of the virtual 3D environment displayed to the second participant during the 3D video conference.

15. The non-transitory computer readable medium according to claim 12 that stores the computer-executable instructions for displaying a default second virtual element that represents the second participant at an absence of the first approval and the second participant approval.

16. The non-transitory computer readable medium according to claim 15 wherein the default second virtual element is a non-participant specific avatar.

17. The non-transitory computer readable medium according to claim 12 wherein the first approval and the second participant approval also include an approval to perform one or more operations regarding the second avatar within the representation.

18. The non-transitory computer readable medium according to claim 17 wherein the one or more operations comprises moving the avatar.

19. The non-transitory computer readable medium according to claim 17 wherein the one or more operations comprises moving the second avatar to track a direction of gaze of the second participant.

20. The non-transitory computer readable medium according to claim 12 wherein the first approval and the second participant approval also include an approval to apply one or more display parameter regarding the second avatar within the representation.

21. The non-transitory computer readable medium according to claim 20 wherein the one or more display parameters comprise a resolution.

22. The non-transitory computer readable medium according to claim 12 that stores the computer-executable instructions for requesting another second participant approval that is related to a manner in which the second avatar is displayed.

* * * * *